United States Patent
Tadaki et al.

(10) Patent No.: US 7,362,404 B2
(45) Date of Patent: Apr. 22, 2008

(54) LIQUID CRYSTAL DISPLAY DEVICE AND METHOD OF MANUFACTURING LIQUID CRYSTAL DISPLAY DEVICE FOR PREVENTING DEFECTS IN LIQUID CRYSTAL

(75) Inventors: Shinji Tadaki, Kawasaki (JP);
Yoshinori Kiyota, Kawasaki (JP);
Toshiaki Yoshihara, Kawasaki (JP);
Hironori Shiroto, Kawasaki (JP);
Tetsuya Makino, Kawasaki (JP);
Shigeo Kasahara, Kawasaki (JP);
Keiichi Betsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 79 days.

(21) Appl. No.: 10/930,529

(22) Filed: Aug. 31, 2004

(65) Prior Publication Data

US 2005/0219456 A1  Oct. 6, 2005

(30) Foreign Application Priority Data

Mar. 31, 2004   (JP)   ............................. 2004-105453

(51) Int. Cl.
*G02F 1/1339* (2006.01)
(52) U.S. Cl. ...................................... 349/156; 349/153
(58) Field of Classification Search ................ 349/153, 349/155–157, 172, 184
See application file for complete search history.

(56) References Cited

U.S. PATENT DOCUMENTS

| | | | |
|---|---|---|---|
| 5,517,344 A | 5/1996 | Hu et al. ........................ 359/8 |
| 5,539,546 A | 7/1996 | Koden et al. | |
| 6,184,967 B1* | 2/2001 | Lagerwall et al. .......... 349/155 |
| 6,567,147 B1* | 5/2003 | Hirakata ..................... 349/153 |
| 6,717,640 B2 | 4/2004 | Sato et al. | |
| 6,724,458 B2* | 4/2004 | Kim et al. ................... 349/156 |
| 2003/0025868 A1* | 2/2003 | Hiroshima et al. ......... 349/156 |
| 2003/0071959 A1* | 4/2003 | Koyama ..................... 349/156 |
| 2003/0128327 A1* | 7/2003 | Noiri .......................... 349/156 |
| 2004/0160566 A1* | 8/2004 | Kawabe et al. ............. 349/153 |

FOREIGN PATENT DOCUMENTS

| | | |
|---|---|---|
| CN | 1480776 A | 3/2004 |
| EP | 0 597 434 | 11/1993 |
| JP | 63-137213 | 6/1988 |
| JP | 8-110524 | 4/1996 |
| JP | 2000-137236 | 5/2000 |

(Continued)

*Primary Examiner*—David Nelms
*Assistant Examiner*—David Chung
(74) *Attorney, Agent, or Firm*—Greer, Burns & Crain, Ltd.

(57) ABSTRACT

In a liquid crystal display device, one or a plurality of partition walls adhering to the two substrates are provided in a region between the adhesive member for sealing the peripheral portions of the two substrates and a display region located inside the adhesive member so as to reduce stress applied to the liquid crystal substance. Even when stress is applied to the liquid crystal substance in the peripheral portion of the substrate, the stress is reduced by the partition wall and is not transmitted to the display region on the opposite side of the partition wall. Therefore, even when a crack occurs in the peripheral portion of the substrate due to the stress, the propagation of the crack is stopped by the partition wall, and the crack does not enter the display region.

18 Claims, 14 Drawing Sheets

FOREIGN PATENT DOCUMENTS

| | | |
|---|---|---|
| JP | 2003-315810 A | 11/2003 |
| KR | 2003-0061659 | 7/2003 |
| KR | 2003-0096653 | 12/2003 |
| TW | 466365 | 12/1998 |
| TW | 440738 | 12/1999 |
| WO | 02/03131 | 1/2002 |

* cited by examiner

LIQUID CRYSTAL DISPLAY DEVICE AND METHOD OF MANUFACTURING LIQUID CRYSTAL DISPLAY DEVICE FOR PREVENTING DEFECTS IN LIQUID CRYSTAL

CROSS-REFERENCE TO RELATED APPLICATIONS

This non-provisional application claims priority under 35 U.S.C. §119(a) on Patent Application No. 2004-105453 filed in Japan on Mar. 31, 2004, the entire contents of which are hereby incorporated by reference.

BACKGROUND OF THE INVENTION

The present invention relates to a liquid crystal display device and a method of manufacturing a liquid crystal display device, and more specifically relates to a liquid crystal display device capable of reducing stress applied to a liquid crystal substance and preventing display defects caused by the stress, and a method of manufacturing the liquid crystal display device.

Along with the recent development of office automation systems, office automation (OA) apparatuses such as word processors, personal computers and PDA (Personal Digital Assistants) have been widely used. With the spread of such OA apparatuses, portable OA apparatuses that can be used in offices as well as outdoors are used, and there are demands for small-size and light-weight of these apparatuses. Liquid crystal display devices are widely used as one of the means to satisfy such demands. Liquid crystal display devices not only have small size and light weight, but also have a power saving feature, and are used in television applications in place of a CRT.

A liquid crystal display device comprises a liquid crystal substance sealed in a gap formed by placing two substrates having electrodes so that the electrodes face each other, and applies a voltage across the electrodes to control the light transmittance of the liquid crystal substance which is determined by the applied voltage. A TN (Twisted Nematic) liquid crystal which is used generally has a millisecond-order response speed to the applied voltage, and the response speed is sometimes abruptly decreased to a value near a hundred millisecond value, particularly, in a region with low applied voltage. Consequently, when displaying moving images (for example, 60 images per second) on a liquid crystal display device using a TN liquid crystal, the liquid crystal molecules can not move sufficiently and the images are blurred, and therefore the TN liquid crystal is not suitable for the display of moving images, such as multimedia applications.

Hence, liquid crystal display devices using a ferroelectric liquid crystal (FLC) or an anti-ferroelectric liquid crystal (AFLC) with a spontaneous polarization and a microsecond-order response speed to the applied voltage have been put to practical use. When such a liquid crystal capable of responding at high speed is used for a liquid crystal display device, it is possible to realize an excellent moving image display by controlling a voltage applied to each pixel electrode by a switching element, such as a TFT and an MIM, and completing the polarization of liquid crystal molecules within a short time.

A conventional liquid crystal display irradiates white light of a backlight composed of a discharge light or a light emitting diode from the rear face of a liquid crystal panel, and realizes a color display with color filters provided on the liquid crystal panel. However, if an FLC or an AFLC is used, since the FLC or AFLC has a high speed response, it is possible to perform time-dividing drive (field sequential drive) that realizes a color display by time-dividing lights of the respective light emitters (for example, red, green and blue (primary colors), or cyan, magenta and yellow (complementary colors)). Accordingly, one pixel can display red, green and blue colors, and it is possible, in theory, to realize a three times higher definition display compared to a liquid crystal display device using color filters.

An FLC is known to form a chevron structure, a bookshelf structure or a layer structure composed of a mixture of these structures. If the FLC is used as a liquid crystal substance, there is a drawback that the layer structure is easily broken by stress applied to the liquid crystal substance, such as an external force that changes the gap.

Therefore, in order to maintain the gap of a predetermined distance against an external force, a method in which adhesive columnar spacers are formed between the substrates is used in practical applications. FIG. 1 is a schematic plan view showing a conventional liquid crystal panel. A conventional liquid crystal panel 100 comprises an array substrate 101 and a counter substrate 102 functioning as a pair of insulating substrates made of glass or quartz with good transmittance in a visible light region. The peripheral portions of the array substrate 101 and counter substrate 102 are sealed with a seal member 104 and a closing member 105 through gap maintaining members (for example, columnar spacers) 103 which are provided in a display region 100a to maintain the clearance dimension (gap). The gap formed by sealing is filled with a liquid crystal substance 106 such as an FLC.

Thus, a technique was invented to maintain the gap of a predetermined distance by forming the adhesive columnar spacers 103 between the two substrates to exhibit effects not only against an external force acting in the direction of reducing the gap, but also against an external force acting in the direction of expanding the gap (see, for example, Japanese Patent Application Laid-Open No. 8-110524/1996).

However, if the adhesive columnar spacers 103 are used, the volume of the liquid crystal substance 106 sealed in the gap is determined at the time the liquid crystal is injected, and, when a temperature change occurs, stress is applied to the liquid crystal substance 106 due to the difference between a change in the volume of the liquid crystal substance 106 and a change in the capacity of the space maintained by the columnar spacers 103. If the columnar spacers 103 are formed at high density, cracks or defects 110 (see FIG. 1) due to the stress occur in the peripheral portion (interface 104a) in a predetermined direction because of the differences in the coefficient of linear expansion (hereinafter referred to as the expansion coefficient) and the modulus of elasticity between the display region in which the columnar spacers 103 are provided and the peripheral portion where the seal member 104 is provided, and the defects 110 enter the display region 100a and cause a problem of degradation of display quality.

For example, if a liquid crystal substance showing the phase transition sequence: isotropic phase (Iso phase)—chiral nematic phase (N* phase)—chiral smectic phase (Sc* phase) is used, the uniform alignment state of the Sc* phase is obtained by applying a DC electric field at the time of phase transition from the N* phase to the Sc* phase, and it is presumed that the defects 110 are caused by the difference in the volume shrinkage at the time of phase transition, namely, the difference between the expansion coefficient in the Sc* phase and the expansion coefficient of a panel component member. Note that the defects 110 tend to occur when the columnar spacers 103 are placed at high density, and it is presumed that the degree (the size (length), density, etc. of defects) is determined by not only the difference of the expansion coefficient of the liquid crystal substance 106 from that of the seal member 104, but also the difference of the expansion coefficient of the liquid crystal substance 106 from that of the columnar spacer 103.

Since the expansion coefficient and the modulus of elasticity are physical values varying depending on the environmental temperature, if a temperature change occurs in the environment where the liquid crystal panel 100 is used, the defects 110 may be caused by this change in the same manner as above. For example, when connecting a drive circuit to the liquid crystal panel 100, since a method in which a metal electrode (for example, gold) formed on a FPC and a metal electrode (for example, aluminum) formed on the liquid crystal panel 100 are connected by thermocompression bonding is used, the defects 110 are caused by the heat. Note that the defects 110 sometimes disappear naturally with the passage of time, but, even when the defects 110 disappeared naturally, there is a possibility that the defects 100 are caused again by a temperature change in the environment where the liquid crystal panel 110 is used.

BRIEF SUMMARY OF THE INVENTION

The present invention has been made with the aim of solving the above problems, and it is an object of the present invention to provide a liquid crystal display device comprising, between two substrates, a partition wall for reducing stress applied to a liquid crystal substance and thereby preventing display defects caused by the stress, and provide a method of manufacturing the liquid crystal display device.

A liquid crystal display device according to a first aspect of the invention is a liquid crystal display device constructed by sealing a liquid crystal substance in a gap formed by sticking peripheral portions of two substrates having electrodes together with one or a plurality of adhesive members, and characterized by comprising one or a plurality of partition walls, adhered to the two substrates in a region between the adhesive member and a display region located inside the adhesive member, for reducing stress applied to the liquid crystal substance.

In the first aspect, by providing the partition wall adhering to the two substrates in the region between the adhesive member for sealing the peripheral portions of the two substrates and the display region located inside the adhesive member, stress applied to the liquid crystal substance is reduced. Consequently, even when stress is applied to the liquid crystal substance in the peripheral portion of the substrate, the stress is reduced by the partition wall and is not transmitted to the display region on the opposite side of the partition wall. Therefore, even when a crack occurs in the peripheral portion of the substrate due to the stress, since the propagation of the crack can be stopped by the partition wall, the crack does not enter the display region.

A liquid crystal display device according to a second aspect of the invention is a liquid crystal display device constructed by sealing a liquid crystal substance composed of a plurality of layers with substantially parallel interfaces in a gap formed by sticking peripheral portions of two substrates having electrodes together with one or a plurality of adhesive members, and characterized by comprising: one or a plurality of partition walls, adhered to the two substrates in a region between the adhesive member and a display region located inside the adhesive member, for reducing stress applied to the liquid crystal substance, wherein a layer touching an end of the partition wall among the plurality of layers is located outside the display region.

In the second aspect, stress applied to the liquid crystal substance is reduced by providing the partition wall adhering to the two substrates in the region between the adhesive member for sealing the peripheral portions of the two substrates and the display region located inside the adhesive member, and, if a liquid crystal substance composed of a plurality of layers with substantially parallel interfaces is sealed in, the partition wall is placed so that a layer touching an end of the partition wall among the plurality of layers is located outside the display region. The liquid crystal substance composed of a plurality of layers with substantially parallel interfaces is, for example, a mono-stable ferroelectric liquid crystal substance. When the plane of the liquid crystal substance is seen from above the substrate (of course, it is invisible to the naked eye), the interfaces of the layers are regularly aligned in substantially parallel straight lines, and the straight line (hereinafter referred to as the layer line) is determined by the rubbing direction of an alignment film and the voltage application direction in the alignment treatment of the manufacturing process. Such a liquid crystal substance has a characteristic that a defect (alignment defect) is caused along the layer line of the liquid crystal substance by stress. Therefore, even when stress is applied to the liquid crystal substance in the peripheral portion of the substrate, the stress is reduced by the partition wall, and, even when a defect occurs in the peripheral portion of the substrate along the layer line of the liquid crystal substance, there is no possibility that the defect appears in the display region because the display region is not present in the course of the defect.

A liquid crystal display device according to a third aspect of the invention is based on the second aspect, and characterized in that the display region is rectangular in shape, and the layer is substantially parallel to any one of side edges of the display region.

In the third aspect, when the display region is rectangular in shape, the layer of the liquid crystal substance is made substantially parallel to any one of side edges of the display region, and therefore the course of the defect coincides with two opposing side edges of the display region and the defect does not enter the display region. The reason for this is that since the liquid crystal substance with a layer structure has a characteristic that an alignment defect occurs along the layer of the liquid crystal substance as mentioned above, it is possible to make almost whole region of the substrate into the display region by using this characteristic.

A liquid crystal display device according to a fourth aspect of the invention is based on any one of the first through third aspects, and characterized by comprising, between the two substrates in the display region, a gap maintaining member for maintaining an opposition distance between the two substrates, wherein the partition wall has an expansion coefficient substantially equal to an expansion coefficient of the gap maintaining member.

In the fourth aspect, when a gap maintaining member for maintaining an opposition distance is provided between the two substrates in the display region, if the partition wall and the gap maintaining member are made of materials having substantially equal expansion coefficients, it is possible to further reduce the stress applied to the liquid crystal substance located inside the partition wall, namely, in the display region.

A liquid crystal display device according to a fifth aspect of the invention is based on any one of the first through fourth aspects, and characterized in that an adhesion strength of the partition wall to the two substrates is lower than an adhesion strength of the adhesive member to the two substrates.

In the fifth aspect, by arranging the adhesion strength of the partition wall to the two substrates to be lower than the adhesion strength of the adhesive member to the two substrates, the stress applied to the liquid crystal substance by the partition wall becomes smaller than the stress caused by the adhesive member. Note that the adhesion strength of the partition wall to the two substrates can be adjusted by the width of the partition wall.

A liquid crystal display device according to a sixth aspect of the invention is based on any one of the first through fifth aspects, and characterized in that the partition wall and the adhesive member are connected so that a gap section is formed between the partition wall and the adhesive member, the gap section is in a state of being filled with a substance having no optical rotatory power or a vacuum state, and polarization plates in a crossed-nicol state are disposed on outer surfaces of the two substrates including the gap section.

In the sixth aspect, a space (gap section) enclosed by the partition wall, adhesive member and two substrates is produced by connecting the partition wall and the adhesive member, and the gap section is in a state of being filled with a substance having no optical rotatory power or a vacuum state. Consequently, unlike the display region, there is no optical rotatory power in the gap section. Besides, since the polarization plates are placed in a crossed-nicol state, light incident from one polarization plate side is not transmitted to the other polarization plate side. Therefore, the space between the partition wall and the adhesive member can be made a light shielding region.

A liquid crystal display device according to a seventh aspect of the invention is based on any one of the first through sixth aspects, and characterized in that the partition wall is placed to enclose the display region, except for a part of an outer circumference of the display region.

In the seventh aspect, by placing the partition wall to enclose the display region, except for a part of the outer circumference of the display region, the course along which a crack (including an alignment defect in the case of using a liquid crystal substance having a layer structure) that occurs in the peripheral portion enters the display region is reduced. The part of the outer circumference of the display region means specifically an aperture portion provided for the injection of liquid crystal. In the case where a liquid crystal substance having a layer structure is used, if the aperture portion is positioned according to the layer line of the liquid crystal substance, the defect does not enter the inside of the partition wall, and therefore almost whole region of the substrate can be made the display region.

A liquid crystal display device according to an eighth aspect of the invention is based on any one of the first through seventh aspects, and characterized in that a plurality of the partition walls are provided, and the partition walls have different widths.

In the eighth aspect, if a liquid crystal display device comprises a plurality of partition walls, stress applied to the liquid crystal substance in the display region is suitably adjusted and reduced by changing the widths of the respective partition walls and placing the partition walls. For example, if the width of the outer partition wall is made wider and the width of the inner partition wall is made narrower, the stress applied to the liquid crystal substance can be reduced gradually from the outer partition wall toward the inner partition wall with respect the display region, and the stress applied to the liquid crystal substance in the innermost partition wall and that in the display region are substantially equal. Therefore, the layer structure of the liquid crystal substance does not change abruptly in the interface.

A method of manufacturing a liquid crystal display device according to a ninth aspect of the invention is a method of manufacturing a liquid crystal display device including a liquid crystal substance sealed in a gap formed by sticking peripheral portions of two substrates having electrodes together with one or a plurality of adhesive members, and one or a plurality of partition walls for reducing stress applied to the liquid crystal substance, the partition wall being disposed between the two substrates at a position outside a display region in which the electrodes are placed, and characterized by comprising the steps of: placing a partition wall having an adhesive property at a position of one of the two substrates, located inside the adhesive member but outside the display region; and adhering the partition wall to the two substrates by placing the two substrates to face each other and applying pressure and heat from outside.

In the ninth aspect, the partition wall with an adhesive property is placed on one of the two substrates at a position located inside the adhesive member but outside the display region, and the partition wall is adhered to the two substrates by placing the two substrates to face each other and applying pressure and heat from outside.

A method of manufacturing a liquid crystal display device according to a tenth aspect of the invention is based on the ninth aspect, and characterized in that the liquid crystal display device comprises, between the two substrates in the display region, a gap maintaining member for maintaining an opposition distance between the two substrates, and the gap maintaining member is formed using a material same as the partition wall so that the partition wall and the gap maintaining member are formed together.

In the tenth aspect, since the gap maintaining member and the partition wall are formed together using the same material, it is possible to reduce the manufacturing process, thereby improving the productivity.

According to the present invention, since stress applied to the liquid crystal substance is reduced by providing, between the two substrates, the partition wall adhering to the two substrates, even when stress is applied to the liquid crystal substance in the peripheral portion of the substrate, the stress is reduced by the partition wall and the transmission of the stress to the display region on the opposite side of the partition wall is prevented, and, even when a crack and an alignment defect occur in the peripheral portion of the substrate due to the stress, it is possible to stop the propagation of the crack and defect by the partition wall. In addition, even when the ratio of the area occupied by the gap maintaining member placed in the display region is made higher than a conventional value, since troubles such as cracks and defects do not occur in the display region, it is possible to achieve satisfactory panel strength and display quality, thereby realizing a liquid crystal display device with higher quality. Further, since the space between the partition wall and the display region serves as a light shielding region, there is no need to provide a light shielding film having a good light shielding property on the inner side of at least one of the two substrates, thereby providing advantageous effects, such as preventing occurrence of alignment defects due to irregularities caused by the formation of the light shielding film, and realizing a reduction in the cost.

The above and further objects and features of the invention will more fully be apparent from the following detailed description with accompanying drawings.

DETAILED DESCRIPTION OF THE INVENTION

The following description will explain in detail the present invention, based on the drawings illustrating some embodiments thereof.

Embodiment 1

Figure 1:
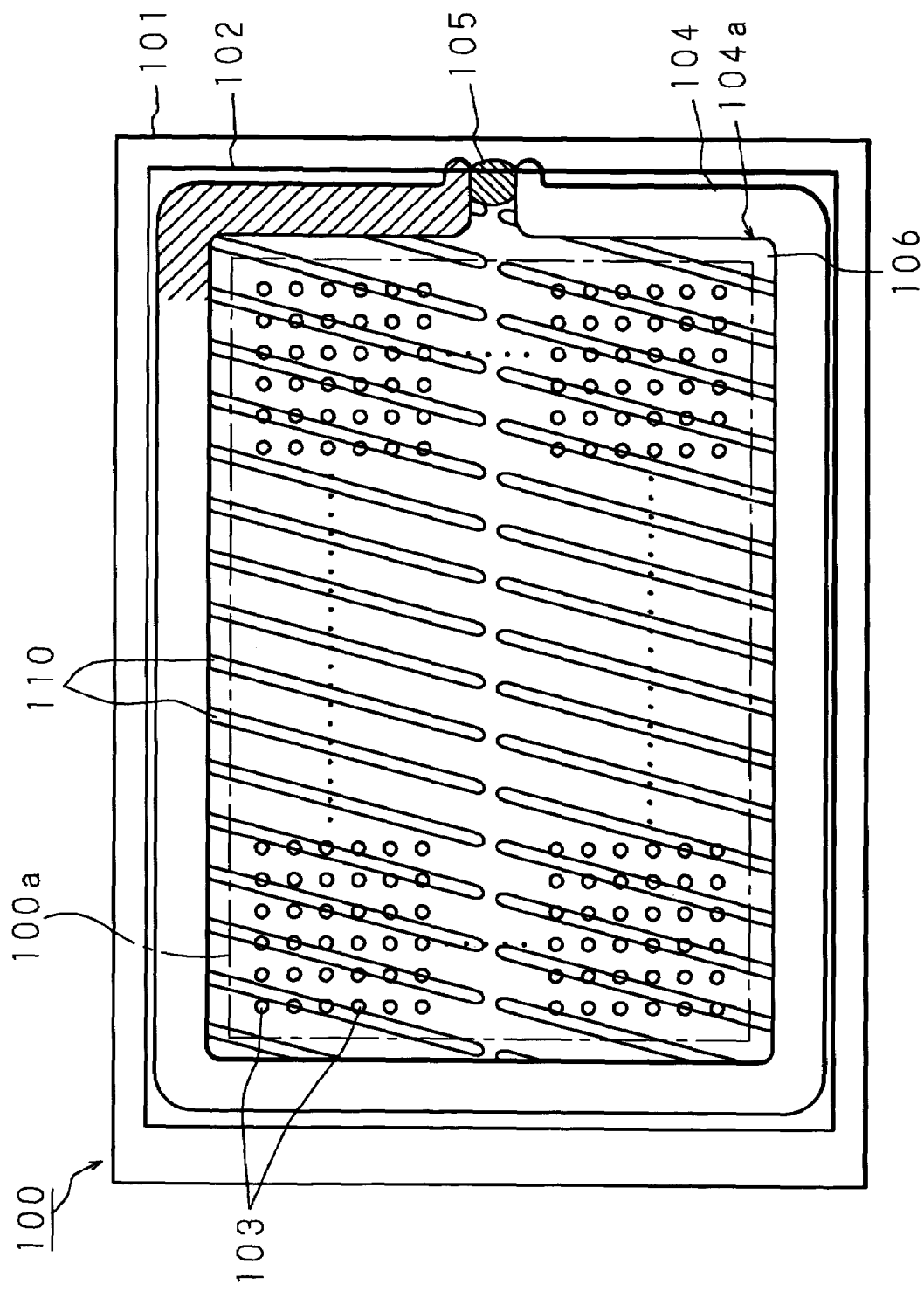
FIG. 1 is a schematic plan view showing a conventional liquid crystal panel.
Figure 2:
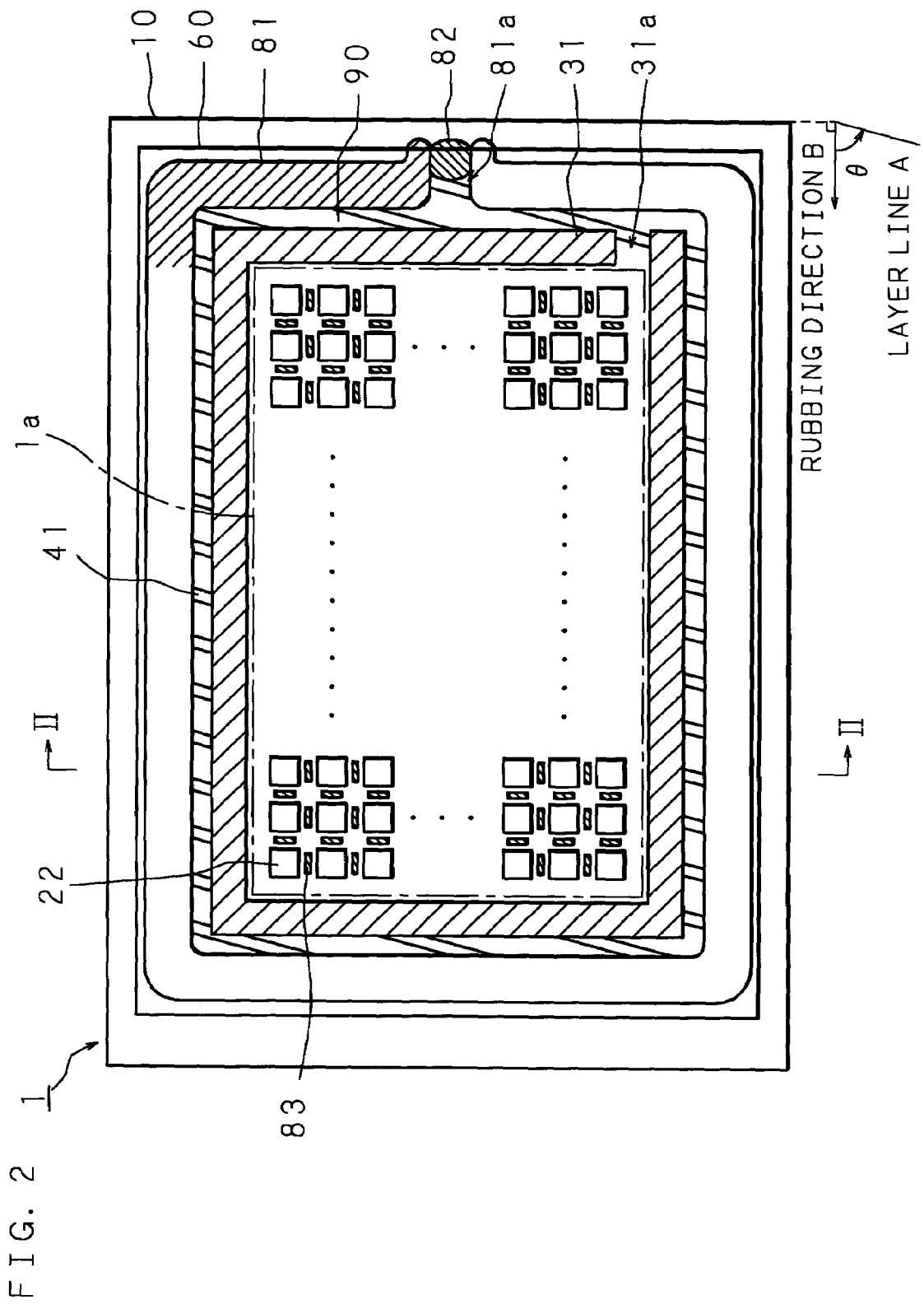
FIG. 2 is a schematic plan view showing one example of a liquid crystal panel according to Embodiment 1 of the present invention.
Figure 3:
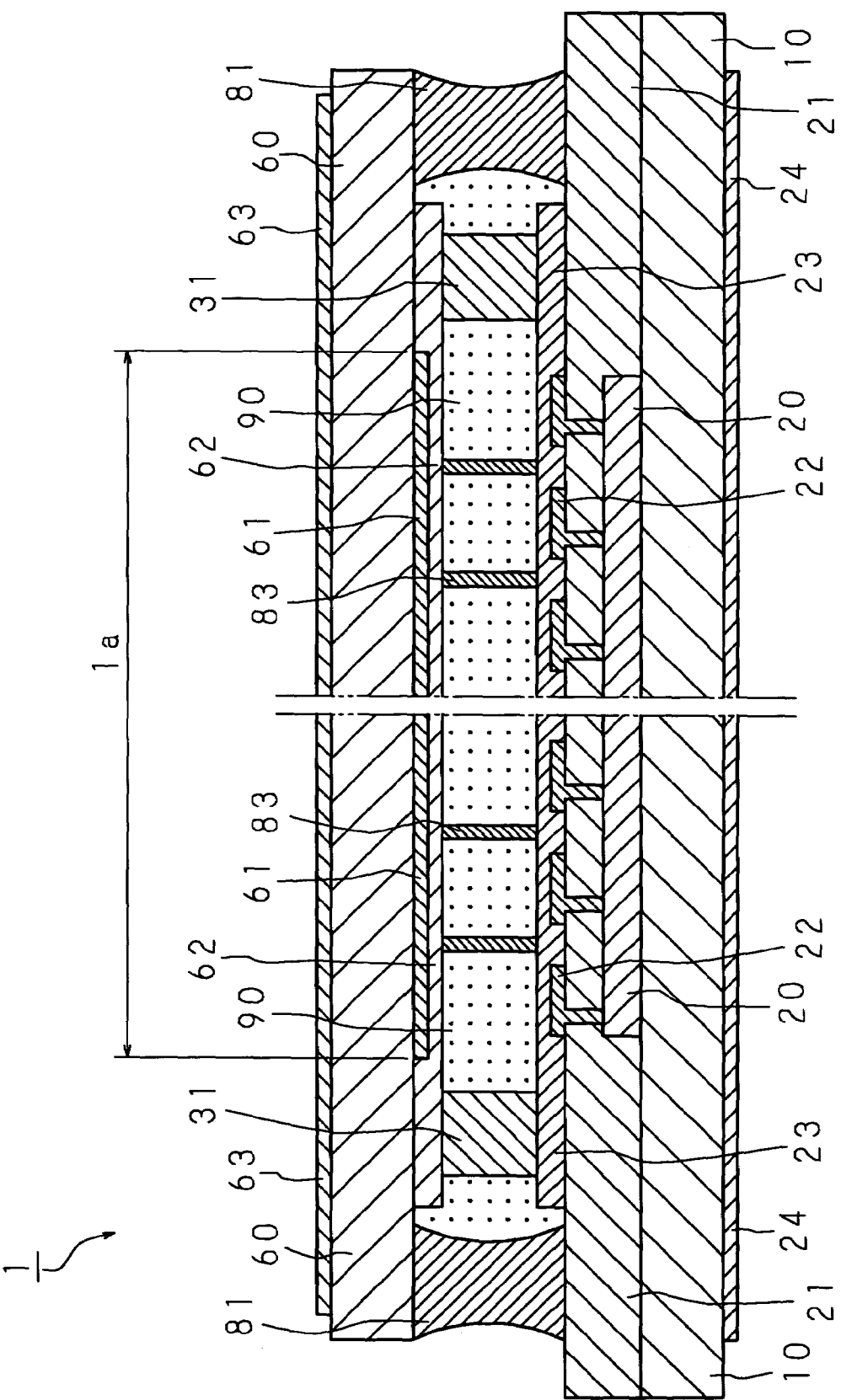
FIG. 3 is a structural cross-sectional view along the II-II line of FIG. 2.

FIG. 2 is a schematic plan view showing one example of a liquid crystal panel according to Embodiment 1 of the present invention, and FIG. 3 is a structural cross-sectional view along the II-II line of FIG. 2. In order to facilitate understanding, a part of the components is not illustrated in FIG. 2. A liquid crystal panel 1 according to Embodiment 1 of the present invention comprises an array substrate 10 and a counter substrate 60 functioning as insulating substrates made of glass or quartz with good transmittance in the visible light region. The peripheral portions of the array substrate 10 and the counter substrate 60 are sealed with a seal member 81 and a closing member 82, and a gap formed by sealing is filled with a liquid crystal substance 90 such as a mono-stable (one-side-stable) ferroelectric liquid crystal material composition.

A TFT layer 20 constituting a TFT matrix is formed in a display region 1a of the array substrate 10, and a 2.5 μm flattening film 21 functioning as a second interlayer insulating film such as a positive acryl-based resin (PMHD-901 available from Sumitomo Chemical Co., Ltd.) is placed on the TFT layer 20. Moreover, pixel electrodes 22 (for example, 130 μm in vertical dimension×130 μm in horizontal dimension) made of ITO (Indium Tin Oxide) with good transmittance are arranged in a matrix form, and connected to a drain electrode of the TFT layer 20 through a contact hole formed in the flattening film 21. Note that, since the base is preferably flat, the flattening film 21 has a relatively thick film thickness of several μm so as to reduce irregularities. Accordingly, as the material of the flattening film 21, materials with good transmittance in the visible light region are preferred so as not to decrease the transmittance of the liquid crystal panel as a whole. Further, by thickening the flattening film 21, it is possible to reduce the parasitic capacity of the TFT layer 20 to the pixel electrodes 22 and reduce crosstalk.

The pixel electrodes 22 are covered with an alignment film 23 with a film thickness of 20 nm. The alignment film 23 is rubbed from the right to left direction with rayon fabric to regulate the side chain direction (tilt angle) of the liquid crystal substance 90. With such structures, the TFT is controlled to be ON/OFF by inputting a scanning signal to be supplied to the gate electrode, so that a data voltage inputted to the source electrode is applied to the pixel electrode 22 during the ON period, and the data voltage applied until then can be maintained during the OFF period. In addition, columnar spacers 83 (for example, 8 μm width× 12 μm length) for maintaining the clearance dimension (gap) between the array substrate 10 and the counter substrate 60 are arranged in a matrix form between the pixel electrodes 22.

A counter electrode (or called common electrode) 61 made of ITO with good transmittance is formed on a surface of the counter substrate 60 opposite to the array substrate 10 so that the counter electrode 61 faces the pixel electrodes 22. Further, similarly to the above-mentioned array substrate 10, the counter electrode 61 is covered with an alignment film 62 with a film thickness of 20 nm. In order to determine the alignment direction of the liquid crystal substance 90 on the counter substrate 60 side, the alignment film 62 is rubbed with rayon fabric to regulate the side chain direction.

Additionally, two polarization plates 24 and 63 whose polarization axis directions cross each other at a right angle (in a crossed-nicol state) are attached to the surfaces of the array substrate 10 and counter substrate 60, respectively, so that the direction of the polarization axis of the polarization plate 24 (or 64) and that of the liquid crystal molecule long axis are aligned. Based on the difference between a voltage applied to the pixel electrode 22 through the TFT and a voltage applied to the counter electrode 61, the light transmittance of the liquid crystal substrate 90 in the display region 1a is controlled, and the amount of transmittance of light emitted from the backlight is controlled to display an image.

Figure 4:
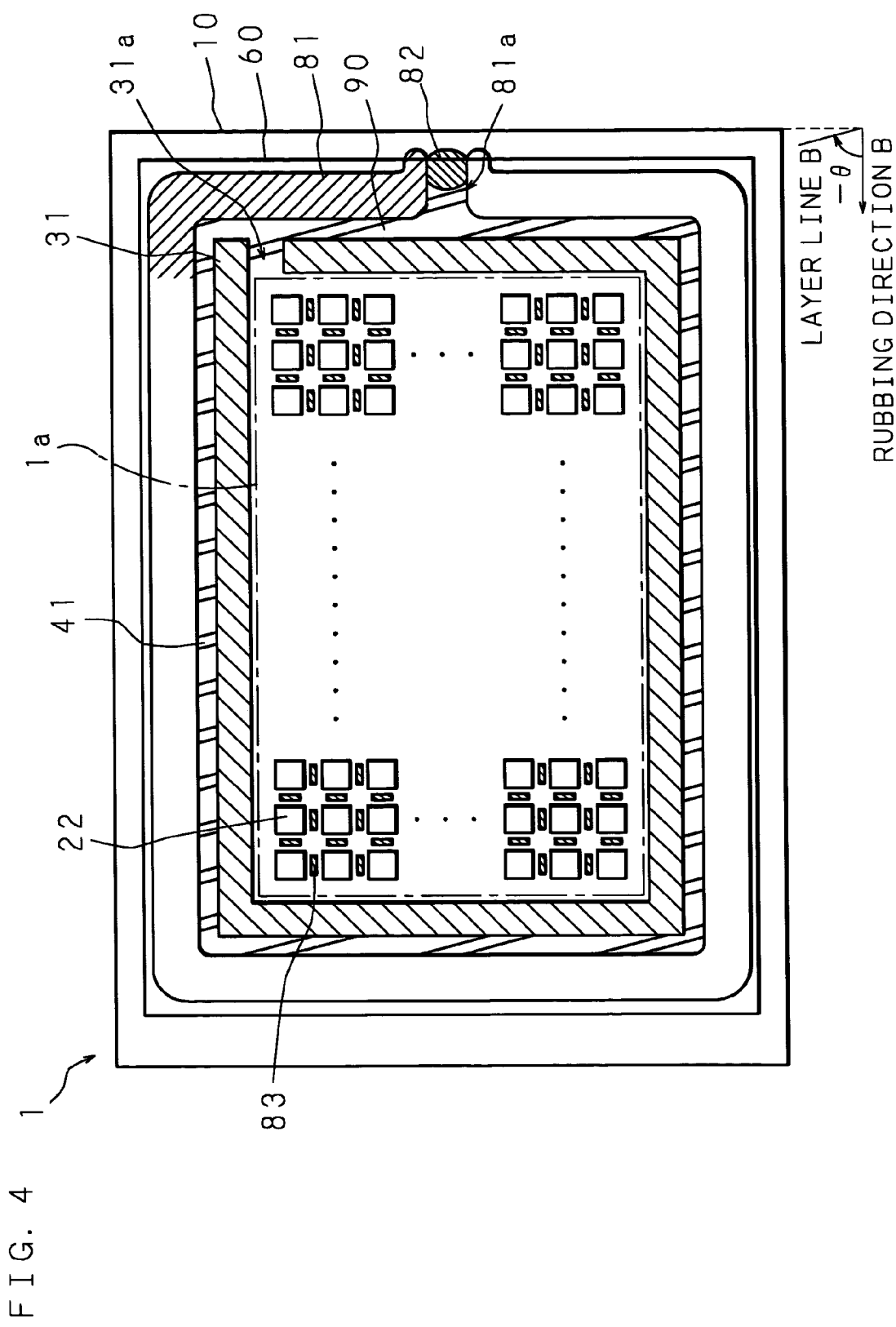
FIG. 4 is a schematic plan view showing another example of a liquid crystal panel according to Embodiment 1 of the present invention.

A partition wall 31 is placed inside the seal member 81, that is, on the display region 1a side, and the partition wall 31 is positioned to enclose the display region 1a, except for an aperture portion 31a formed by opening a part of a side located on the liquid crystal inlet 81a side so as to guide the liquid crystal substance 90 to the display region 1a in a liquid crystal injection step. The position where the aperture portion 31a is formed may be decided according to the inclination of a layer line A of the liquid crystal substance 90. As shown in FIG. 2, when the inclination of the layer line A is positive, the aperture portion 31a is formed on the lower side, or, as shown in FIG. 4, when the inclination of the layer line A is negative, the aperture portion 31a is formed on the upper side. In other words, when the liquid crystal substance 90 composed of a plurality of layers with substantially parallel interfaces is sealed in, a layer touching an end of the partition wall 31 among the plurality of layers is located outside the display region 1a.

The layer line A of the liquid crystal substance 90 is determined by the characteristic of the material, and it is supposed hereinafter that the layer line A is a direction of an angle θ (for example, 75° in a clockwise direction) with respect to a rubbing direction B. The partition wall 31 is made of a material having the same expansion coefficient as the columnar spacer 83, and a specific example of the numerical value is $100 \times 10^{-6}$(/° C.). Thus, if the partition wall 31 and the columnar spacer 83 have the same expansion coefficient, the difference between the gap in a region where the partition wall 31 is provided and the gap in the display region 1a where the pixel electrodes 22 are provided is reduced, and stress applied to the liquid crystal substance 90 is reduced. Moreover, the width of the partition wall 31 is narrower than that of the seal member 81, and the adhesion strength of the partition wall 31 to the two substrates is lower than the adhesion strength of the seal member 81 to the two substrates.

Next, a method of manufacturing a liquid crystal panel 1 having structures as described above will be explained. Since the manufacturing methods of the array substrate and the counter substrate, such as the method of forming a TFT functioning as a switching element on the array substrate, are the same as the conventional methods, the explanation thereof is omitted. FIGS. 5A through 5F are views for explaining a method of manufacturing a liquid crystal panel by sticking an array substrate and a counter substrate together.

Figure 5A:
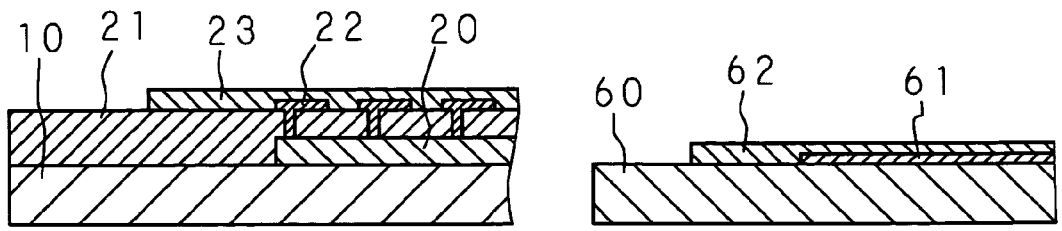
FIGS. 5A through 5F are views for explaining a method of manufacturing a liquid crystal panel by sticking an array substrate and a counter substrate together.

First, an alignment film solution such as a polyamic acid solution is applied by a spin coater onto an array substrate 10 on which a TFT layer 20, a flattening film 21 and pixel electrodes 22 were formed, and then sintered at 200° C. for 30 minutes to form an alignment film 23 with a film thickness of 20 nm. Similarly, an alignment film 62 with a film thickness of 20 nm is formed on a counter substrate 60 on which a counter electrode 61 was formed (FIG. 5A).

Figure 5B:
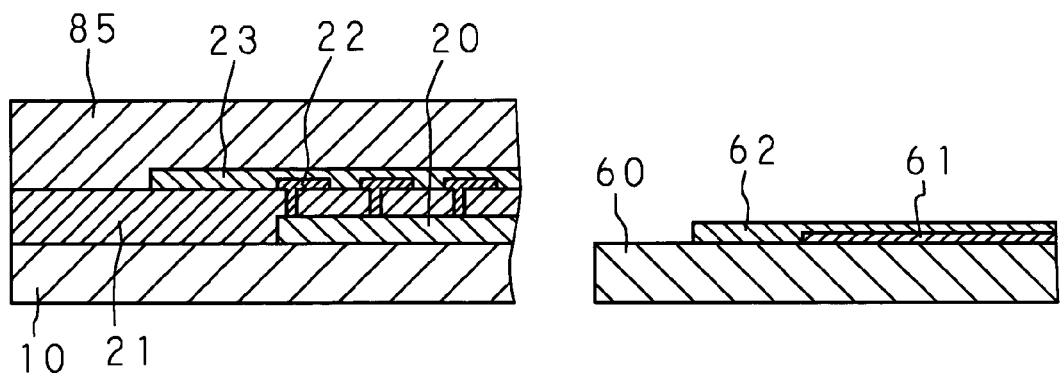
Figure 5C:
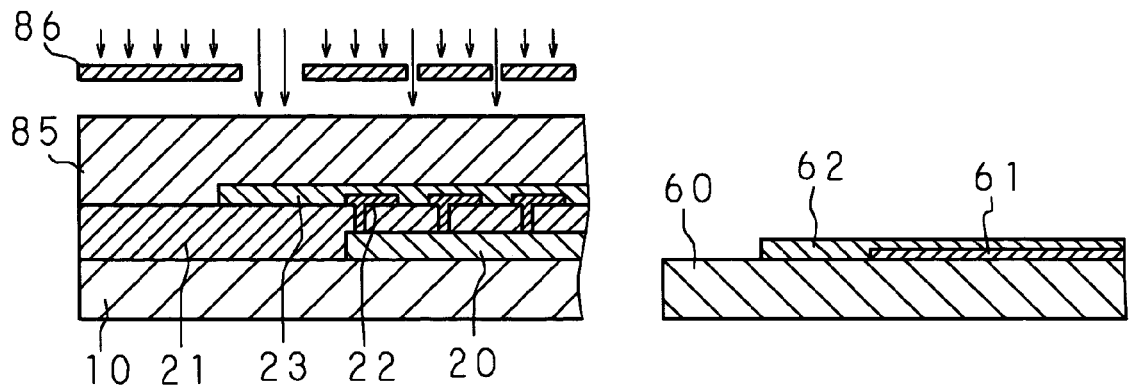
Figure 5D:
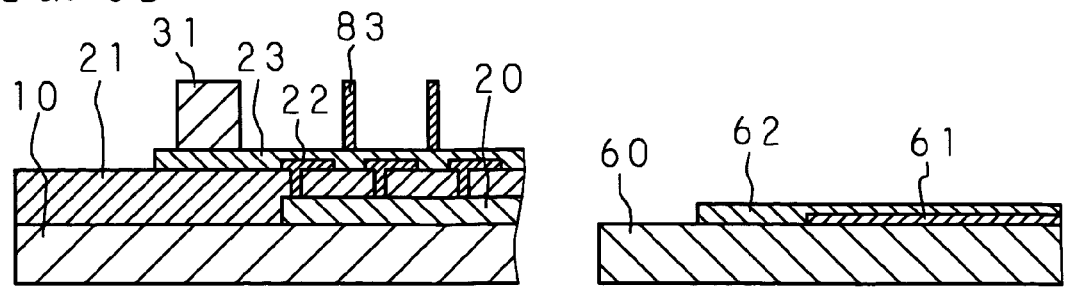

Next, a photosensitive resin (for example, a positive acryl-based resist) 85 exhibiting an adhesive property in a later-described panel hardening condition is deposited on the array substrate 10, and pre-baked at 80° C. for 30 minutes (FIG. 5B). Next, in order to form a columnar spacer 83 in the shape of a 8×12 μm rectangle in plan view between the pixel electrodes 22 and 22 and form a partition wall 31 with a width of 50 μm at a predetermined position (inside a seal formation region), 200 mJ/cm2 ultraviolet rays are irradiated through an exposure mask 86 with a pattern corresponding to the columnar spacers 83 and partition wall 31 (FIG. 5C). Then, after removing unexposed portions by spraying a development liquid, the resin is post-baked at 140° C. for 5 minutes to form the columnar spacers 83 and the partition wall 31 (FIG. 5D). Consequently, the ratio of the area occupied by the columnar spacers 83 in the display region is slightly more than 1%. At this time, the partition wall 31 and the columnar spacer 83 have a height of 2.5 μm after the post-baking. Note that the partition wall 31 and the columnar spacer 83 may be a thermosetting resin or a thermoplastic resin, and it is not necessarily to use the same material for the partition wall 31 and the columnar spacer 83. Of course, an uncured resin thread (for example, an epoxy resin thread) formed in a predetermined width in advance may be placed at a position where the partition wall is to be formed. Thereafter, a rubbing treatment is performed using rayon fabric to regulate the side chain direction of the alignment film 23 on the array substrate 10.

Figure 5E:
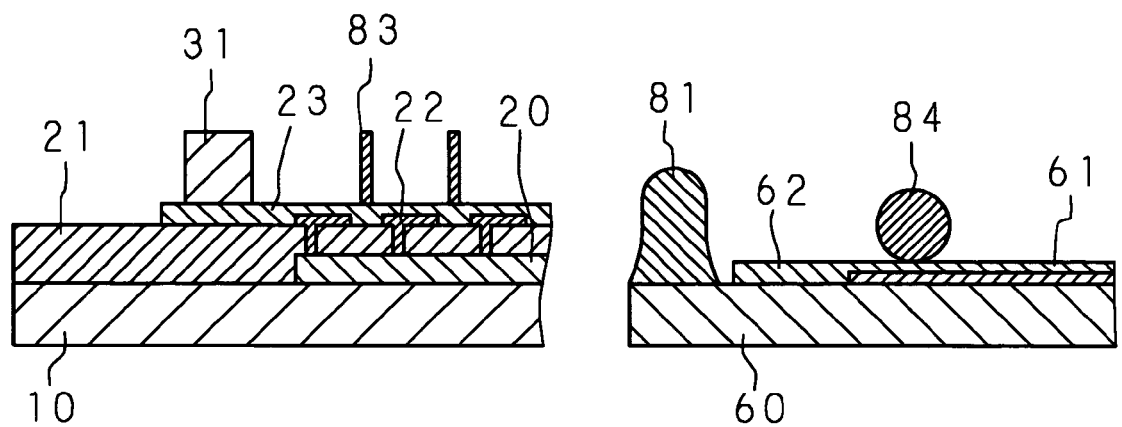

On the other hand, after performing a rubbing treatment by using rayon fabric to regulate the side chain direction of the alignment film 62 on the counter substrate 60, spherical silica beads (with a particle diameter of 1.8 μm) 84 are sprayed onto the counter substrate 60 by an electrostatic spray method or a dry spray method, and a thermosetting seal member 81 in an uncured state is applied in a ring form to the peripheral portion by a dispenser (FIG. 5E). Note that the seal member 81 is provided with a liquid crystal inlet.

Figure 5F:
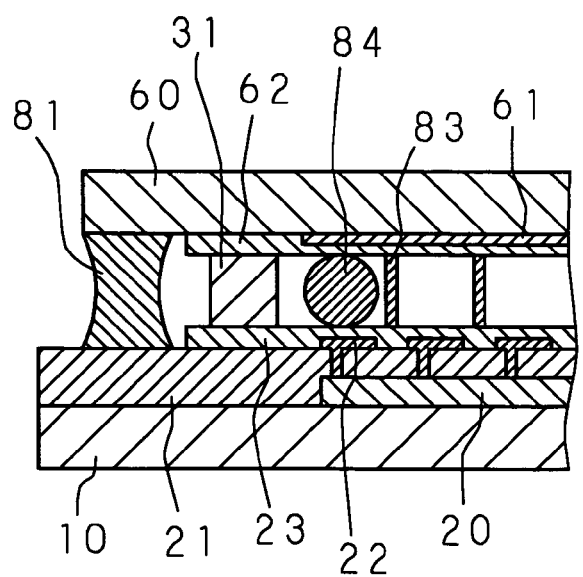

Next, the array substrate 10 and the counter substrate 60 are aligned and vacuum packed by a vacuum packaging machine to produce a pressurized state in which atmospheric pressure is applied from the outside of the array substrate 10 and counter substrate 60, and then heated at 135° C. for 90 minutes while maintaining the pressurized state so as to adhere the columnar spacers 83, partition wall 31 and seal member 81 to the array substrate 10 and counter substrate 60 (FIG. 5F). At this time, the silica beads 84 function as an assistant member for determining a gap value, and the partition wall 31 and the seal member 81 are adhered to the two substrates when the gap value is equal to the particle diameter of the silica beads 84, and consequently the partition wall 31 and the columnar spacer 83 have a height of 1.8 μm.

Subsequently, the liquid crystal substance 90 such as a mono-stable (one-side-stable) ferroelectric liquid crystal material composition is heated to a chiral nematic state and injected by a vacuum injection method from the liquid crystal inlet provided in a part of the seal member 81, and then the liquid crystal inlet is closed with a UV curing resin. Next, after performing an alignment treatment by heating the liquid crystal substance 90 until it changes into a chiral nematic state and applying a predetermined DC voltage (12 V (electric field strength: 5 V/μm)) across the pixel electrode 22 and the counter electrode 61 over a temperature range in the vicinity of the transition temperature between N* phase—Sc* phase, the liquid crystal substance 90 is cooled to room temperature. Thus, at the time of phase transition to the Sc* phase, a uniform electric field is applied to the display region 1a having the pixel electrodes 22, and the liquid crystal substance 90 has a uniform alignment state (layer structure). Further, two polarization plates 24 and 63 arranged in a crossed-nicol state are attached to the surfaces of the array substrate 10 and counter substrate 60, respectively, in a state in which the direction of the polarization axis of the polarization plate 24 (or 63) and that of the liquid crystal molecule long axis are aligned, and consequently a liquid crystal panel is produced.

Next, the display quality of the liquid crystal panel 1 having the above-described structures was evaluated. First, although the ratio of the area occupied by the columnar spacers 83 in the liquid crystal panel 1 is slightly more than 1%, defects 41, which appeared just after the alignment treatment in a conventional liquid crystal panel as shown in FIGS. 2 and 4, did not appear in the display region 1a. In addition, even when a temperature cycle test was performed on the liquid crystal panel 1, the defects 41 did not appear in the display region 1a.

The reasons for this are presumed as follows. By forming the partition wall 31 having the same expansion coefficient as the columnar spacer 83 (note that the partition wall 31 with a lower expansion coefficient than the seal member 81 was used in this case) inside the seal member 81, stress applied to the liquid crystal substance in the interface of the seal member 81 is reduced by the partition wall 31, and, even when the columnar spacers 83 are placed at high density, the propagation of defects 41 that occurred in the seal member 81 as the starting point is prevented by the partition wall 31, and therefore the defects 41 did not appear in the display region 1a.

Embodiment 2

Figure 6:
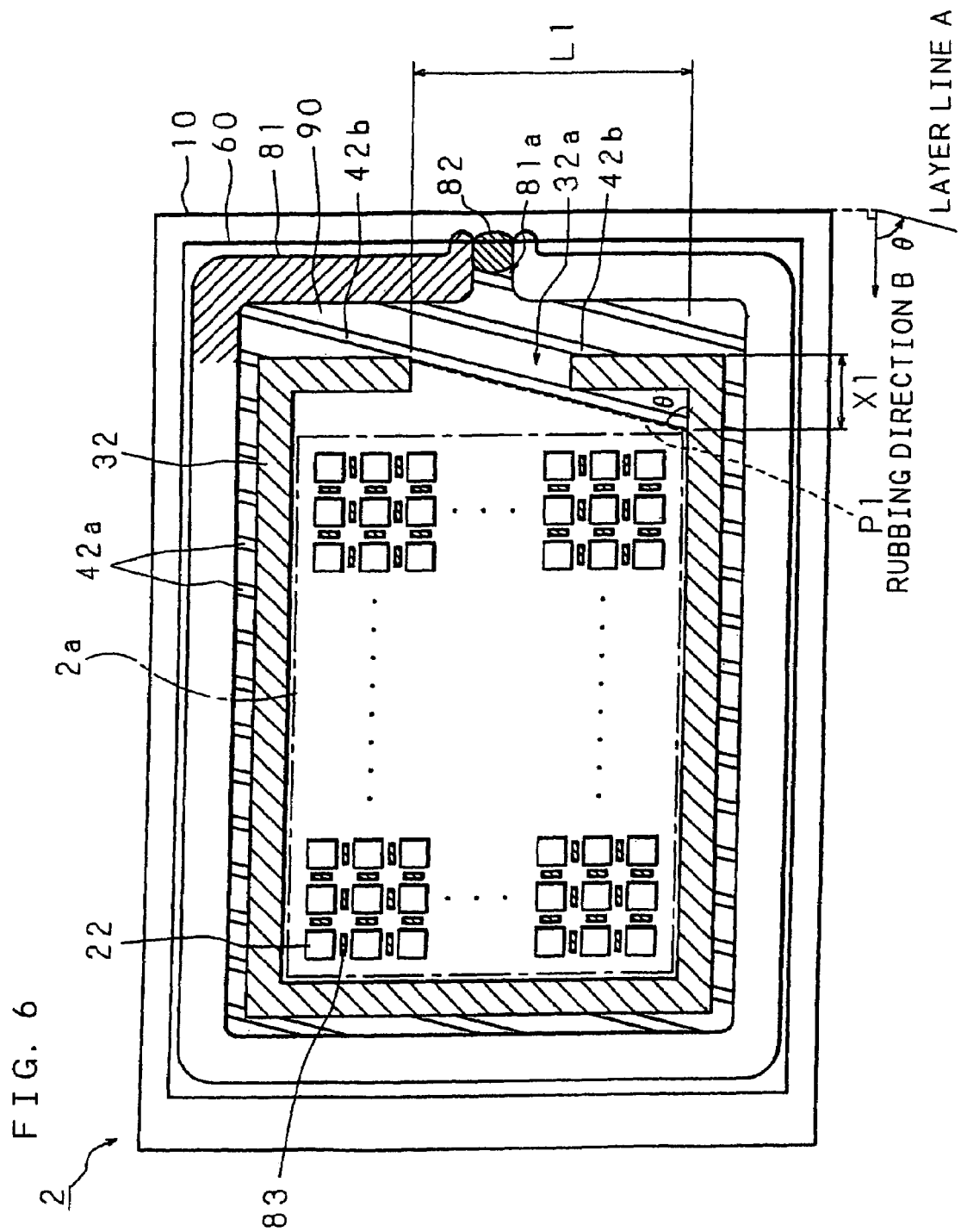
FIG. 6 is a schematic plan view showing one example of a liquid crystal panel according to Embodiment 2 of the present invention.

In Embodiment 1, the position of the aperture portion 31a provided in the partition wall 31 is determined according to the layer line A of the liquid crystal substance so as to prevent the defects 41 that occur in the seal member 81 from entering the display region 1a, but the position of the aperture portion 31a may be located at any position on the liquid crystal inlet 81a side, and Embodiment 2 illustrates such an example. FIG. 6 is a schematic plan view showing one example of a liquid crystal panel according to Embodiment 2 of the present invention, and a part of the components is not illustrated in FIG. 6 to facilitate understanding.

A liquid crystal panel 2 according to Embodiment 2 of the present invention has a partition wall 32 inside the seal member 81, that is, on the display region 2a side, and the partition wall 32 has an aperture portion 32a produced by opening the center of a side on the liquid crystal inlet 81a side so as to guide the liquid crystal substance 90 to the display region 2a in the liquid crystal injection step. Since other structures are the same as those of Embodiment 1, the corresponding parts are designated with the same codes, and the detailed explanation thereof is omitted.

Next, the display quality of the liquid crystal panel 2 having the above-described structures was evaluated. First, although the ratio of the area occupied by the columnar spacers in the liquid crystal panel 2 is slightly more than 1%, as shown in FIG. 6, defects 42a and 42b which appeared in a conventional liquid crystal panel just after the alignment treatment did not appear in the display region 2a. In addition, even when a temperature cycle test was performed on the liquid crystal panel 2, the defects 42a and 42b did not appear in the display region 2a.

The reasons for this are presumed that since the partition wall 32 prevents the propagation of the defects 42a among the defects 42a and 42b that occurred in the seal member 81 as the starting point, the defects 42a did not appear in the display region 2a. On the other hand, the propagation of the defects 42b among the defects 42a and 42b cannot be prevented because the partition wall 32 is not present in the course of the defects 42b. However, since the display region 2a is set in a more inward location than the course of the defects 42b, it is naturally presumed that the defects 42b did not appear in the display region 2a.

In short, in Embodiment 2, although the defects 42b propagate into a region located inside the partition wall 32, since the course of the defects 42b is regulated according to the layer line A of the liquid crystal substance 90, it is possible to know the course of the defects 42b from the rubbing direction B of the alignment film that determines the layer line A of the liquid crystal substance 90. Consequently, since a region where defects will occur can be surely understood at the stage of designing the liquid crystal panel 2, it is possible to design the position of the pixel electrodes 22 to prevent the defects from entering the display region 2a.

A distance X1 from a side of the partition wall 32 on the liquid crystal inlet 81a side to the display region 2a is designed to satisfy X1=L1/tan (θ), where L1 is a normal distance of a layer line P1 of the liquid crystal substance 90 touching an end of the partition wall 32 to a side where it touches the partition wall 32, and θ is an intersection angle between the layer line P1 of the liquid crystal substance 90 and the side of the partition wall 32. Thus, it is possible to design the liquid crystal panel so that even when the defects 42b occur in actual use, the defects 42b are stopped outside the display region 2a and do not affect the display quality. Further, by providing the aperture portion 32a in the vicinity of the liquid crystal inlet 81a, the present invention has the advantage of smoothing the injection of the liquid crystal substance 90 and shortening the injection time in the manufacturing process.

Embodiment 3

Figure 7:
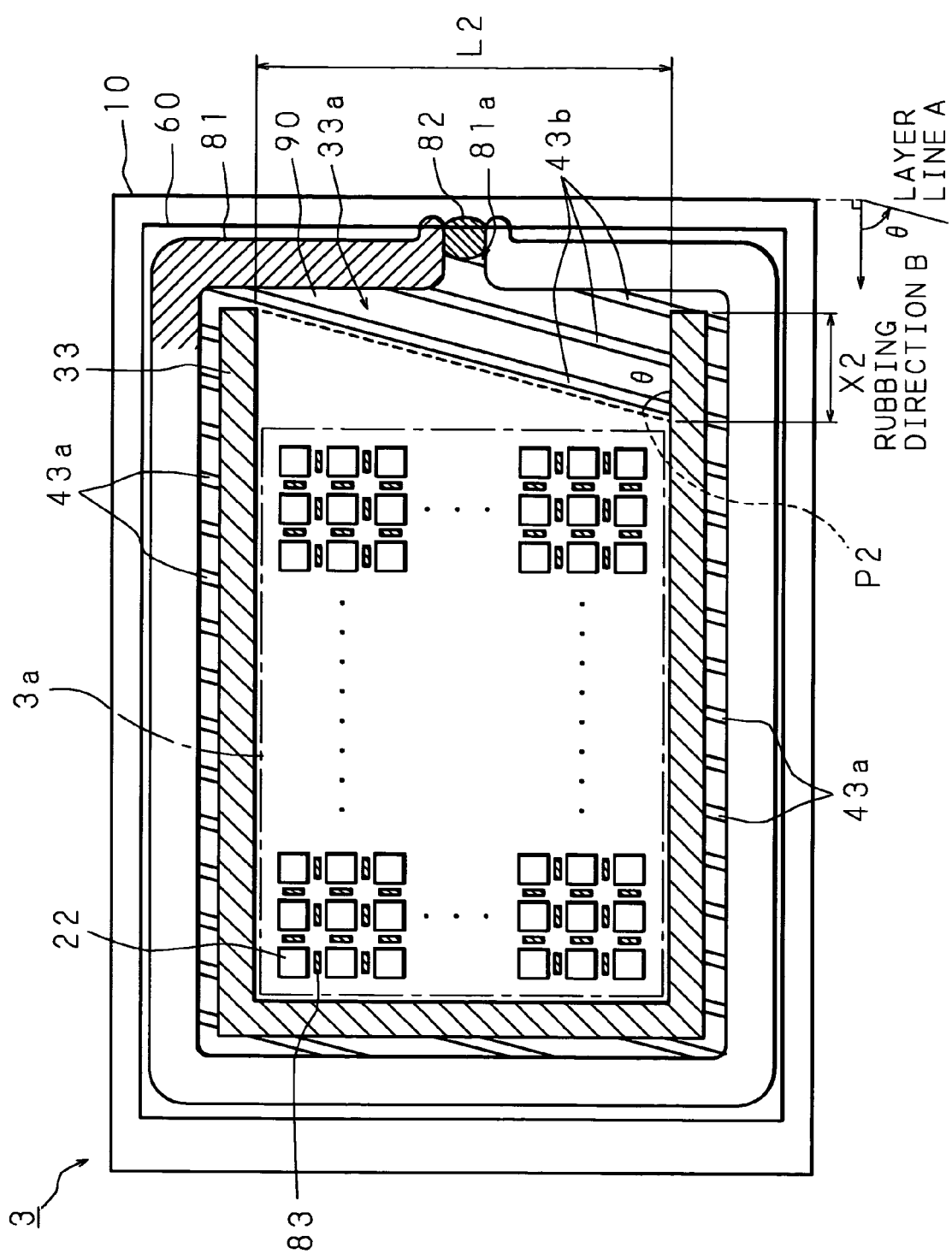
FIG. 7 is a schematic plan view showing one example of a liquid crystal panel according to Embodiment 3 of the present invention.

In Embodiments 1 and 2, the partition walls 31 and 32 having the aperture portions 31a and 32a with small size are provided, but, it may also be possible to provide the partition wall with a large aperture portion, for example, in the shape of letter "C", and Embodiment 3 illustrates such an example. FIG. 7 is a schematic plan view showing one example of a liquid crystal panel according to Embodiment 3 of the present invention, and a part of the components is not illustrated in FIG. 7 to facilitate understanding.

A liquid crystal panel 3 according to Embodiment 3 of the present invention has a C-shaped partition wall 33 inside the seal member 81, that is, on the display region 3a side, and the partition wall 33 is placed so that its aperture portion 33a is open in the liquid crystal inlet 81a side to guide the liquid crystal substance 90 to the display region 3a in the liquid crystal injection step. Since other structures are the same as those of Embodiment 1, the corresponding parts are designated with the same codes, and the detailed explanation thereof is omitted.

Next, the display quality of the liquid crystal panel 3 having the above-described structures was evaluated. First, although the ratio of the area occupied by the columnar spacers in the liquid crystal panel 3 is slightly more than 1%, as shown in FIG. 7, defects 43a and 43b which occurred in a conventional liquid crystal panel just after the alignment treatment did not appear in the display region 3a. In addition, even when a temperature cycle test was performed on the liquid crystal panel 3, the defects 43a and 43b did not appear in the display region 3a.

The reasons for this are presumed that since the partition wall 33 prevents the propagation of the defects 43a among the defects 42a and 42b that occurred in the seal member 81 as the starting point, the defects 43a did not appear in the display region 3a. On the other hand, the propagation of the defects 43b among the defects 43a and 43b cannot be prevented because the partition wall 33 is not present in the course of the defects 43b. However, since the display region 3a is set in a more inward location than the course of the defects 43b, it is naturally presumed that the defects 43b did not appear in the display region 3a.

In short, in Embodiment 3, the defects 43b propagate into a region located inside the partition wall 33, but since the course of the defects 43b is regulated according to the layer line A of the liquid crystal substance 90, it is possible to know the course of the defects 43b from the rubbing direction B of the alignment film that determines the layer line A of the liquid crystal substance 90. Consequently, since a region where defects occurs can be surely understood at the stage of designing the liquid crystal panel 3, it is possible to design the position of the pixel electrodes 22 to prevent the defects from entering the display region 3a.

A distance X2 from a side of the partition wall 33 on the liquid crystal inlet 81a side to the display region 3a is designed to satisfy X2=L2/tan (θ), where L2 is a normal distance of a layer line P2 of the liquid crystal substance 90 touching an end of the partition wall 33 to a side where it touches the partition wall 33, and θ is an intersection angle between the layer line P2 of the liquid crystal substance 90 and the side of the partition wall 33. Thus, it is possible to design the liquid crystal panel so that even when the defects 43b occur in actual use, the defects 43b are stopped outside the display region 3a and do not affect the display quality. Further, by placing the C-shaped partition wall 33 so that the aperture portion 33a is open on the liquid crystal inlet 81a side, the present invention has the advantage of smoothing the injection of the liquid crystal substance 90 and shortening the injection time in the manufacturing process.

Embodiment 4

Figure 8:
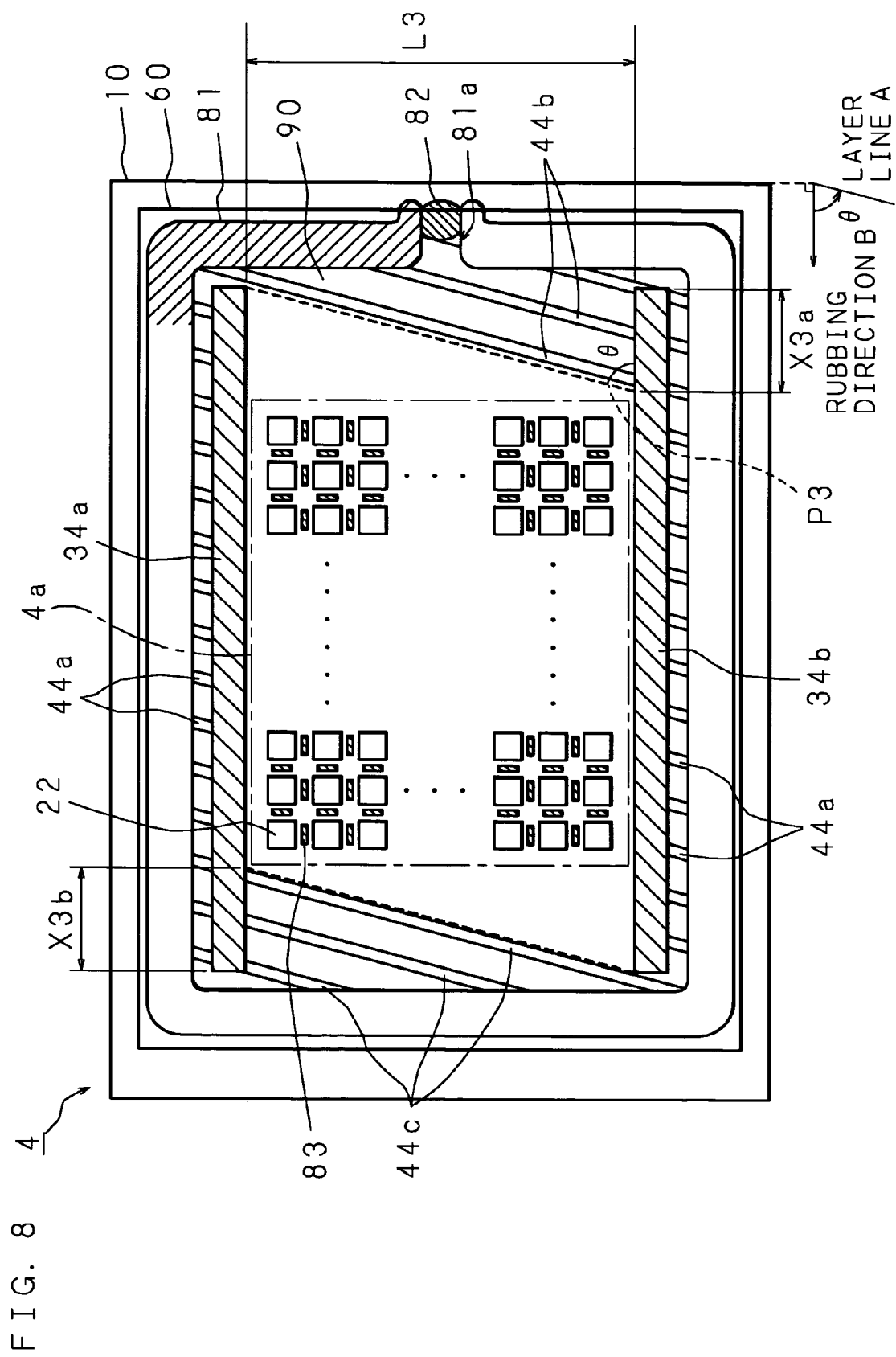
FIG. 8 is a schematic plan view showing one example of a liquid crystal panel according to Embodiment 4 of the present invention.

FIG. 8 is a schematic plan view showing one example of a liquid crystal panel according to Embodiment 4 of the present invention, and a part of the components is not illustrated in FIG. 8 to facilitate understanding.

A liquid crystal panel 4 according to Embodiment 4 of the present invention has partition walls 34a and 34b in a striped pattern in a direction of display region 4a along the respective long sides of the seal member 81. Since other structures are the same as those of Embodiment 1, the corresponding parts are designated with the same codes, and the detailed explanation thereof is omitted.

Next, the display quality of the liquid crystal panel 4 having the above-described structures was evaluated. First, although the ratio of the area occupied by the columnar spacers in the liquid crystal panel 4 is slightly more than 1%, as shown in FIG. 8, defects 44a, 44b and 44c which occurred in a conventional liquid crystal panel just after the alignment treatment did not appear in the display region 4a. In addition, even when a temperature cycle test was performed on the liquid crystal panel 4, the defects 44a, 44b and 44c did not appear in the display region 4a.

The reasons for this are presumed that since the partition walls 34a and 34b prevent the propagation of the defects 44a among the defects 44a, 44b and 44c that occurred in the seal member 81 as the starting point, the defects 44a did not appear in the display region 4a. On the other hand, the propagation of the defects 44b and 44c cannot be prevented because the partition walls 34a and 34b are not present in the courses of the defects 44b and 44c. However, since the display region 4a is set in a more inward location than the courses of the defects 44b and 44c, it is naturally presumed that the defects 44b and 44c did not appear in the display region 4a.

In short, in Embodiment 4, the defects 44b and 44c propagate into a region located inside the partition walls 34a and 34b, but since their course is regulated according to the layer line A of the liquid crystal substance 90, it is possible to know the courses of the defects 44b and 44c from the rubbing direction B of the alignment film that determines the layer line A of the liquid crystal substance 90. Consequently, since a region where defects occur can be surely understood at the stage of designing the liquid crystal panel 4, it is possible to design the position of the pixel electrodes 22 to prevent the defects from entering the display region 4a.

A distance X3a from the right end of the partition wall 34b to the display region 4a is designed to satisfy X3 a=L3/tan (θ), where L3 is a normal distance of a layer line P3 of the liquid crystal substance 90 touching the right end of the partition wall 34a to a side of the partition wall 34b where it intersects the partition wall 34b, namely, the opposition distance between the partition walls 34a and 34b, and θ is an intersection angle at which the layer line P3 of the liquid crystal substance 90 intersects the side of the partition wall 34b. Similarly, a distance X3b from the left end of the partition wall 34a to the display region 4a is designed to satisfy X3b=L3/tan (θ). Thus, it is possible to design the liquid crystal panel so that, even when the defects 44b and 44c occur in actual use, the defects 44b and 44c are stopped outside the display region 4a and do not affect the display quality. Note that even when the partition walls 34a and 34b in a striped pattern are provided, the time required for injecting liquid crystal substance 90 is not increased compared to the conventional structure.

Embodiment 5

Figure 9:
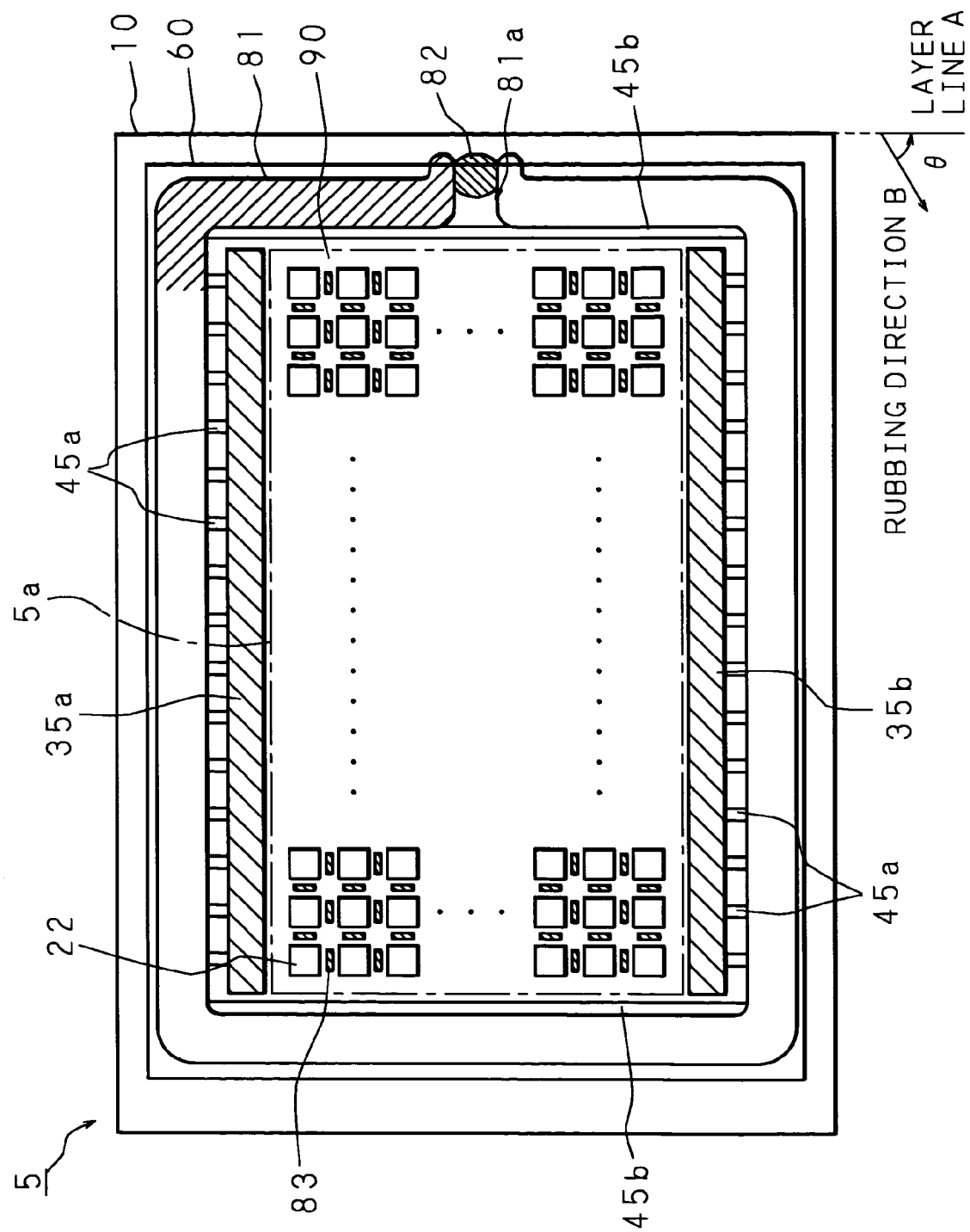
FIG. 9 is a schematic plan view showing one example of a liquid crystal panel according to Embodiment 5 of the present invention.

In Embodiments 2 through 4, the display region is set according to the position of the aperture portion and the layer line A of the liquid crystal substance so as to prevent a defect that occurs in the seal member from entering the display region, but it may also be possible to control the course of the defect that occurs in the seal member, and Embodiment 5 illustrates such an example. FIG. 9 is a schematic plan view showing one example of a liquid crystal panel according to Embodiment 5 of the present invention, and a part of the components is not illustrated in FIG. 9 to facilitate understanding.

Similarly to Embodiment 4, a liquid crystal panel 5 according to Embodiment 5 of the present invention has partition walls 35a and 35b in a striped pattern in a direction of a display region 5a along the respective long sides of the seal member 81. Note that, unlike Embodiment 4, the liquid crystal panel 5 is rubbed in the 75° direction with respect to the short-side direction of the display region 5a (the 15° direction with respect to the long-side direction). Since a liquid crystal substance forming an angle of 75° between the rubbing direction B and the layer line A is used, the short-side direction of the display region 5a and the layer line A are parallel. Since other structures are the same as those of Embodiment 1, the corresponding parts are designated with the same codes, and the detailed explanation thereof is omitted.

Next, the display quality of the liquid crystal panel 5 having the above-described structures was evaluated. First, although the ratio of the area occupied by the columnar spacers in the liquid crystal panel 5 is slightly more than 1%, as shown in FIG. 9, defects 45a, 45b and 45c which occurred in a conventional liquid crystal panel just after the alignment treatment did not appear in the display region 5a. In addition, even when a temperature cycle test was performed on the liquid crystal panel 5, the defects 45a, 45b and 45c did not appear in the display region 5a.

The reasons for this are presumed that since the partition walls 35a and 35b prevent the propagation of the defects 45a among the defects 45a and 45b that occurred in the seal member 81 as the starting point, the defects 45a did not appear in the display region 5a. On the other hand, the propagation of the defects 45b cannot be prevented because the partition walls 35a and 35b are not present in the course of the defects 45b. However, since the rubbing direction B is set to the 15° direction with respect of the long-side direction of the liquid crystal panel 5, it is presumed that the course of the defects 45b (of course, including 45a) is equal to the normal direction of the partition walls 35a and 35b, and the defects 45b do not enter the display region 5a.

In other words, the defects 45a and 45b propagate along the layer line A of the liquid crystal substance, but it is presumed that it was possible to control the courses of the defects 45a and 45b by controlling the rubbing direction B. Moreover, in this embodiment, since substantially the entire region of the substrate can be made the display region, it is possible to use the substrate more effectively compared to Embodiments 2 through 4.

Note that Embodiment 5 illustrates a form in which the liquid crystal panel 5 is rubbed in the 75° direction with respect to the short-side direction of the display region 5a, but it may also be possible to rub the liquid crystal panel 5 in the 75° direction with respect to the long-side direction of the display region 5a (the 15° direction with respect to the short-side direction). In this case, since the long-side direction of the display region 5a and the layer line A are parallel, the partition walls may be placed on each short side of the seal member 81.

By the way, as the semiconductor used for the TFT layer, amorphous silicon and polysilicon are mainly used. The amorphous silicon has low mobility and it is difficult to incorporate drive circuits such as a gate driver and a source driver, and therefore the distance between the display region and the peripheral portion is generally short. Consequently, in a liquid crystal panel made of amorphous silicon, even when the distance between the display region and the peripheral portion is short, it is preferable to adopt structures as described in Embodiment 1 or Embodiment 5 in which defects do not appear in the display region.

On the other hand, the polysilicon has high mobility and it is possible to incorporate drive circuits such as a gate driver and a source driver, and therefore the drive circuits are generally placed in the peripheral portion of the panel. Consequently, in a liquid crystal panel made of polysilicon, the distance between the display region and the peripheral portion is longer, and therefore even when structures as described in Embodiments 2 through 4 are adopted, there should not be much bad effect.

Embodiment 6

Figure 10:
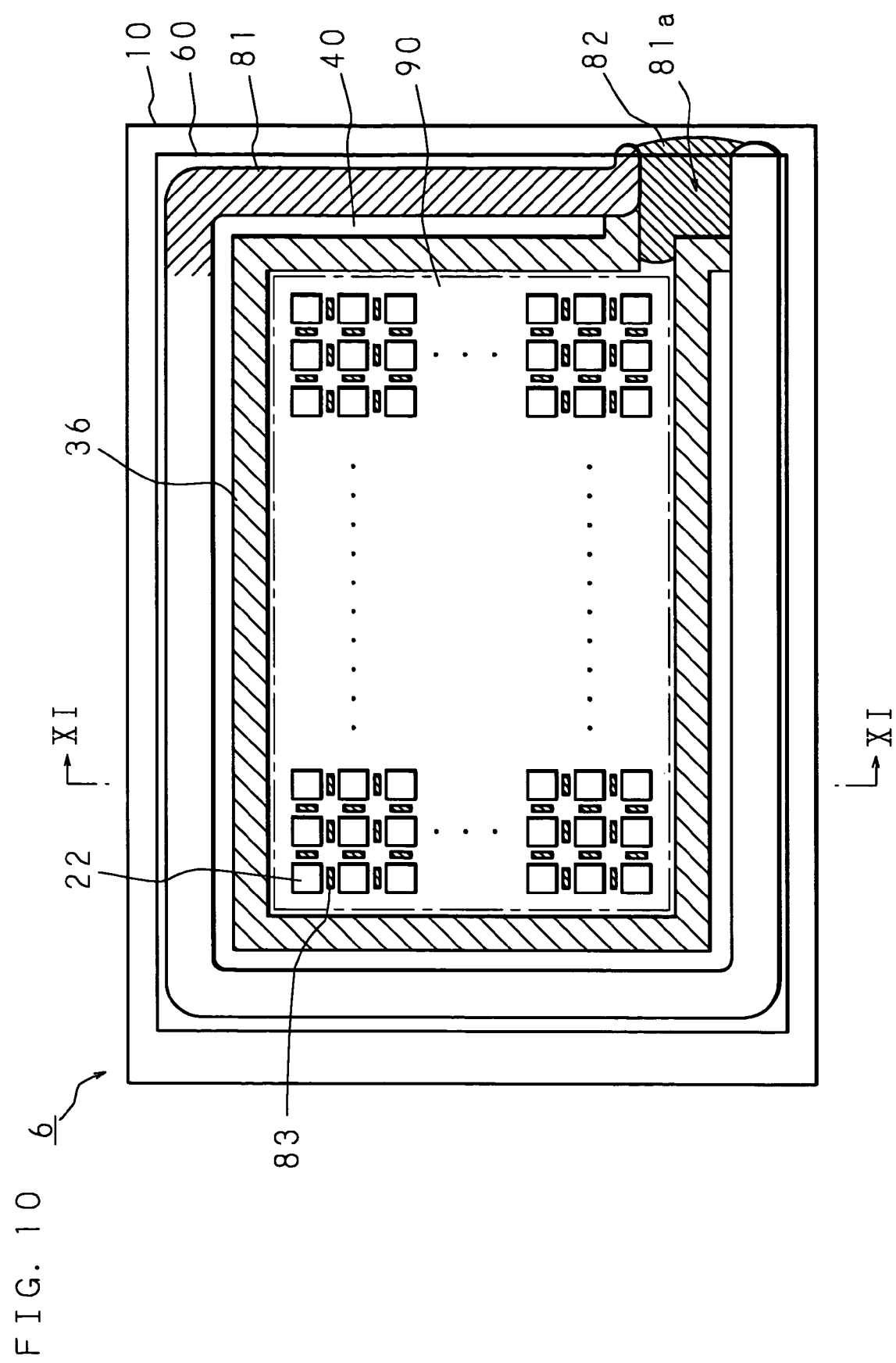
FIG. 10 is a schematic plan view showing one example of a liquid crystal panel according to Embodiment 6 of the present invention.
Figure 11:
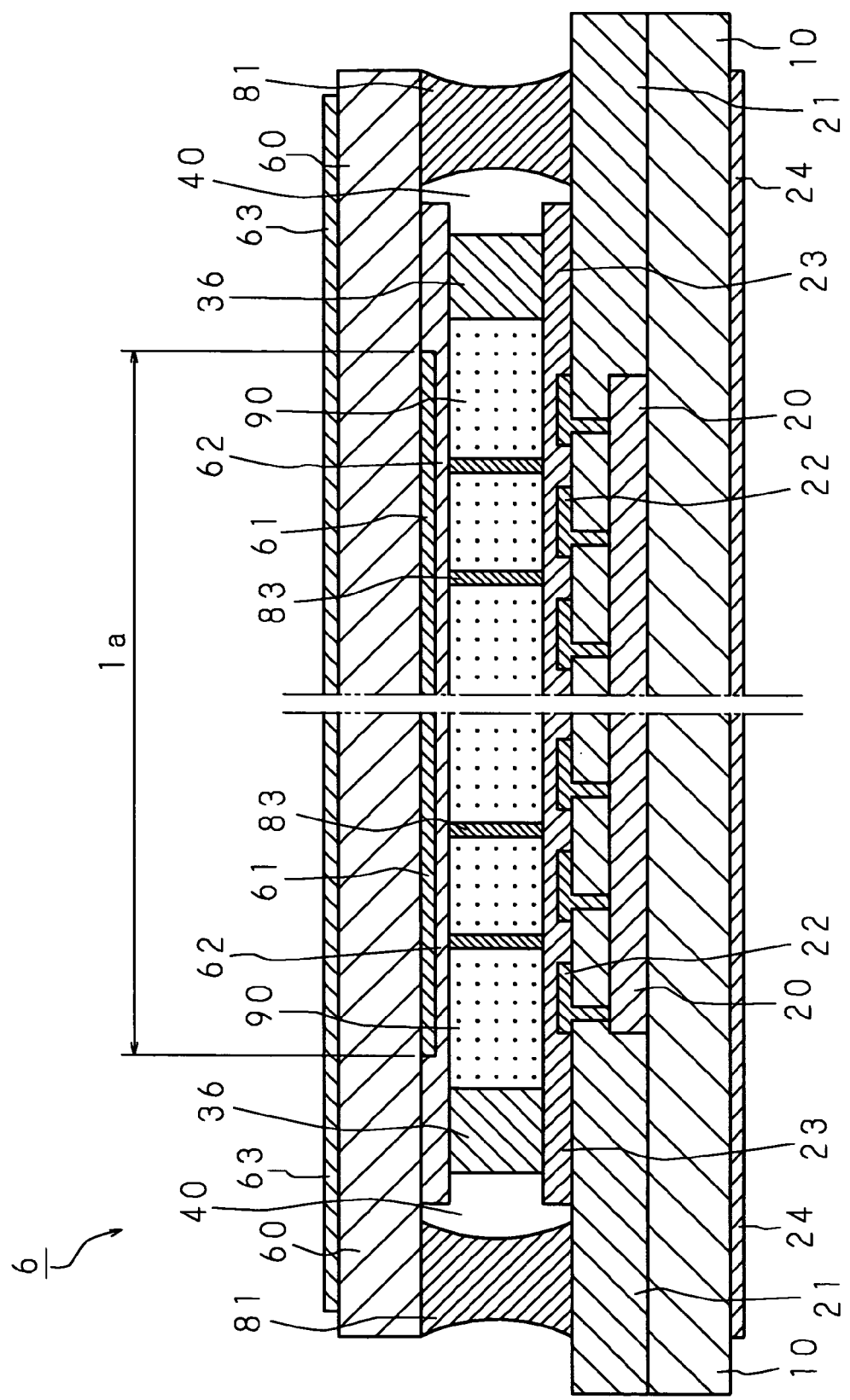
FIG. 11 is a structural cross-sectional view along the XI-XI line of FIG. 10.

FIG. 10 is a schematic plan view showing one example of a liquid crystal panel according to Embodiment 6 of the present invention, and FIG. 11 is a structural cross-sectional view along the XI-XI line of FIG. 10. In order to facilitate understanding, a part of the components is not illustrated in FIG. 10.

A liquid crystal panel 6 according to Embodiment 6 of the present invention comprises a seal member 81 with a liquid crystal inlet 81a located in the lower right corner of the two substrates 10 and 60, and a partition wall 36 placed inside the seal member 81. Both ends of the partition wall 36 are connected to the seal member 81, and a gap section 40 is formed between the partition wall 36 and the seal member 81. The gap section 40 is in a vacuum state. In order to bring the gap section 40 into the vacuum state, the array substrate 10 and the counter substrate 60 are stuck together under vacuum. Since other structures are the same as those of Embodiment 1, the corresponding parts are designated with the same codes, and the detailed explanation thereof is omitted.

Thus, since the gap section 40 is in the vacuum state, there is no optical rotatory power in the gap section 40 unlike the display region 6a, and light incident from the polarization plate 63 side will not be transmitted through the polarization plate 24 side due to the polarization plates 24 and 63 arranged in a crossed-nicol state. Therefore, by providing the gap section 40, the gap section 40 can serve as a light shielding region. Consequently, there is no need to provide a light shielding film with excellent light shielding properties such as Cr (chromium) or WSi2 (wolfram (tungsten) silicide) on the inside of either the substrate 10 or 60, thereby realizing a reduction in the cost. Moreover, by forming such a metal, irregularities are caused in the edge (interface) of the light shielding film and alignment defects may be caused by the irregularities. However, if the gap section 40 is caused to function as a light shielding region as in the present invention, irregularities do not occur, and there is no possibility of alignment defects.

Embodiment 7

Figure 12:
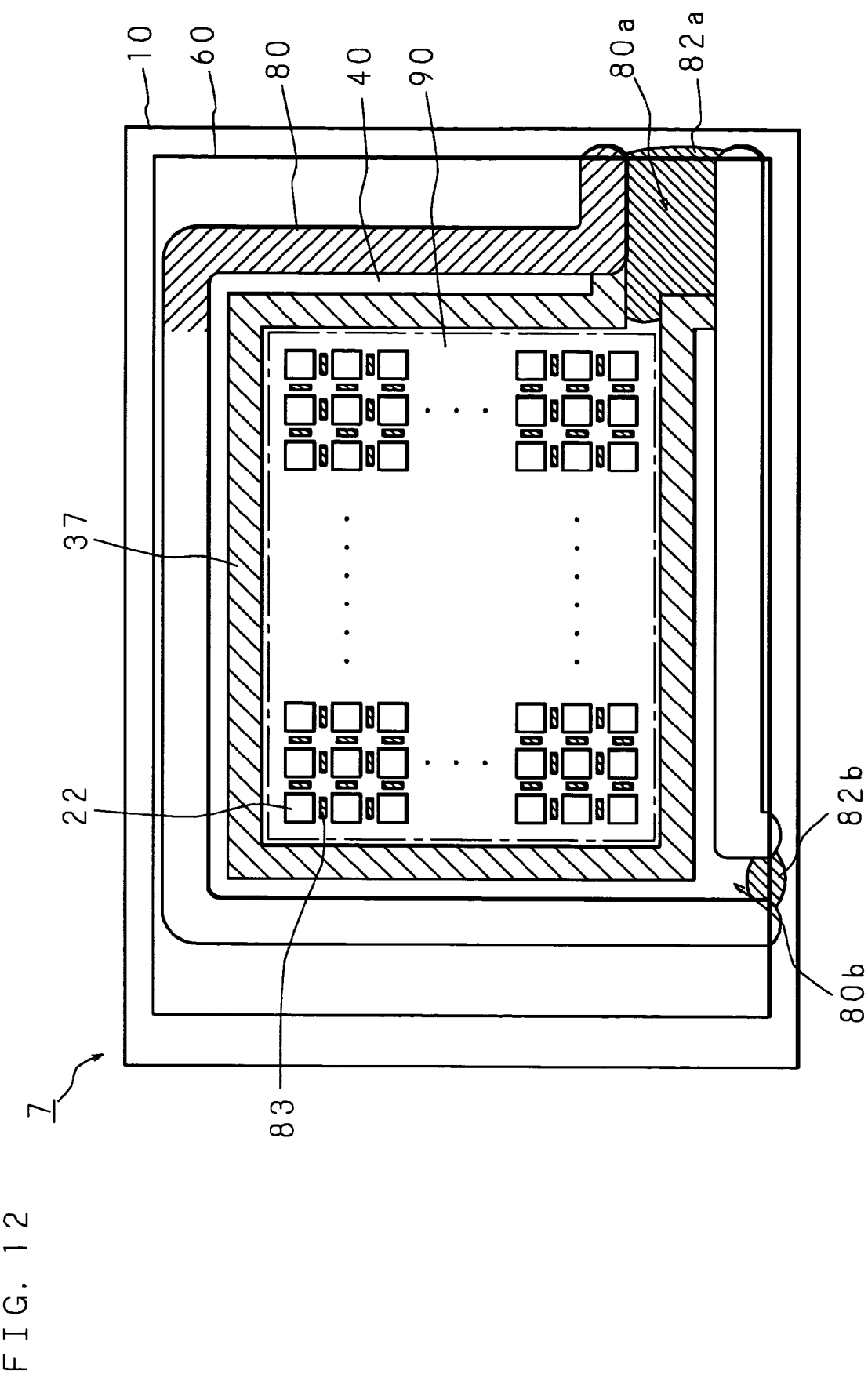
FIG. 12 is a schematic plan view showing one example of a liquid crystal panel according to Embodiment 7 of the present invention.

In Embodiment 6, the gap section formed by connecting both ends of the partition wall to the seal member is brought into a vacuum state, but it may also be possible to fill the gap section with a substance having no optical rotatory power, and Embodiment 7 illustrates such an example. FIG. 12 is a schematic plan view showing one example of a liquid crystal panel according to Embodiment 7 of the present invention, and a part of the components is not illustrated in FIG. 12 to facilitate understanding.

A liquid crystal panel 7 according to Embodiment 7 of the present invention comprises a seal member 80 with a first inlet 80a located in the lower right corner of the two substrates 10 and 60 and a second inlet 80b located in the lower left corner, and a partition wall 37 placed inside the seal member 80. Both ends of the partition wall 37 are connected to the seal member 80. The first inlet 80a is provided for injecting the liquid crystal substance 90 between the substrates, while the second inlet 80b is provided for injecting a substance with no optical rotatory power between the substrates. Moreover, the first inlet 80a is sealed with a closing member 82a after injecting the liquid crystal substance 90, and the second inlet 80b is sealed with a closing member 82b after injecting the substance with no optical rotatory power into the gap section 40. As the substance with no optical rotatory power, it is possible to use a substance having no optical rotatory power such as a gas and a liquid, for example. Since other structures are the same as those of Embodiment 1, the corresponding parts are designated with the same codes, and the detailed explanation thereof is omitted.

Thus, since the gap section 40 is filled with the substance with no optical rotatory power, similarly to Embodiment 6, in the gap section 40, unlike the display region 6a, light incident from the polarization plate 63 side will not be transmitted through the polarization plate 24 side due to the polarization plates 24 and 63 arranged in a crossed-nicol state.

Note that each of the above-described embodiments illustrates a case where the partition wall is made of a material having the same expansion coefficient as the columnar spacer, but the partition wall may have an expansion coefficient between the expansion coefficients of the columnar spacer and the seal member.

Figure 13:
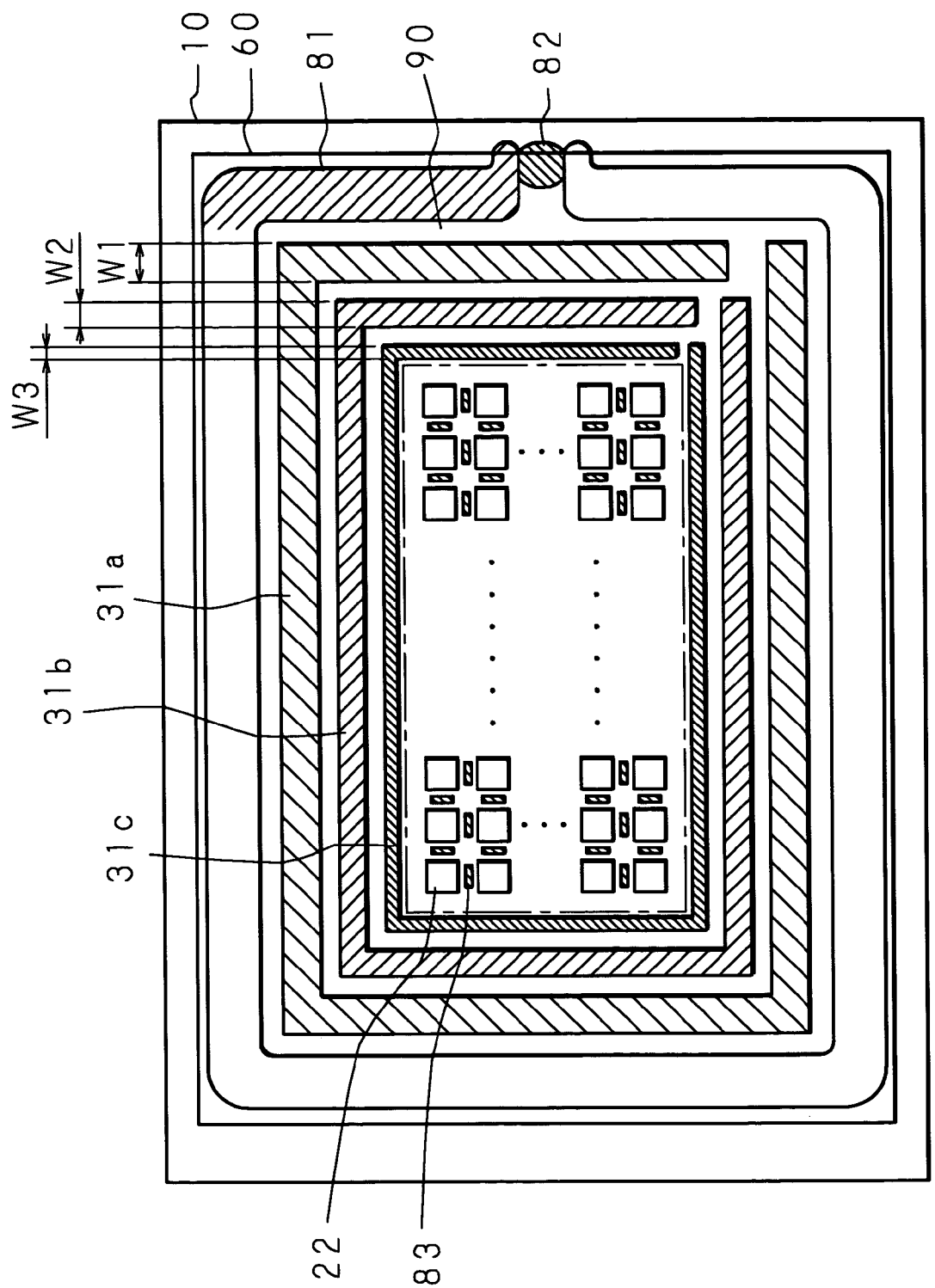
FIG. 13 is a schematic plan view showing another example of a liquid crystal panel according to the present invention.

Moreover, each embodiment explains a case where one partition wall is provided (two partition walls are provided in Embodiment 4), it may also be possible to provide a plurality of partition walls between the display region and the peripheral portion. As shown in FIG. 13, for example, when three partition walls 31a, 31b and 31c are provided, if the width of the outermost partition wall 31a is W1, the width of the innermost partition wall 31c is W3, and the width of the partition wall 31b therebetween is W2, it is preferable to satisfy W1>W2>W3. Thus, if the outer partition wall has a wider width and the inner partition wall has a narrower width, the stress applied to the liquid crystal substance can be reduced gradually from the outer partition wall toward the inner partition wall in the display region, and the stress applied to the liquid crystal substrate in the innermost partition wall and that in the display region are substantially the same. Therefore, the layer structure of the liquid crystal substance does not change abruptly in the interface. It may of course be possible to adjust the modulus of elasticity by changing the materials of the partition walls from the outer partition wall toward the inner partition wall, instead of changing the widths of the partition walls.

Further, in each of the embodiments, the partition wall is formed on the flattening film. However, even when the partition wall is formed in a region where the flattening film is not formed, the same effects can also be obtained.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A liquid crystal display device comprising:
two substrates having electrodes;
one or a plurality of adhesive members for sticking peripheral portions of said substrates together so that a gap for sealing a liquid crystal substance is formed; and
a continuous partition wall having a single aperture therethrough, adhered to said two substrates in a region between said adhesive member and a display region located inside said adhesive member, for reducing stress applied to said liquid crystal substance in the peripheral portions of said substrates;
wherein a layer of said liquid crystal substance touching an end of said partition wall is located outside said display region, thereby preventing defects from extending into said display region, and
wherein an area between the adhesive member and the continuous partition wall is configured to receive the liquid crystal substance.

2. A liquid crystal display device comprising:
two substrates having electrodes;
one or a plurality of adhesive members for sticking peripheral portions of said substrates together so that a gap for sealing a liquid crystal substance composed of a plurality of layers with substantially parallel interfaces is formed; and
a continuous partition wall having a single aperture therethrough, adhered to said two substrates in a region between said adhesive member and a display region located inside said adhesive member, for reducing stress applied to said liquid crystal substance,
wherein a layer touching an end of said partition wall among said plurality of layers is located outside said display region, thereby preventing defects from extending into said display region.

3. The liquid crystal display device according to claim 2, wherein
said display region is rectangular in shape, and said layer is substantially parallel to any one of side edges of said display region.

4. The liquid crystal display device according to claim 1, further comprising
a gap maintaining member, disposed between said two substrates in said display region, for maintaining an opposition distance between said two substrates,
wherein said partition wall has an expansion coefficient substantially equal to an expansion coefficient of said gap maintaining member.

5. The liquid crystal display device according to claim 2, further comprising
a gap maintaining member, disposed between said two substrates in said display region, for maintaining an opposition distance between said two substrates,
wherein said partition wall has an expansion coefficient substantially equal to an expansion coefficient of said gap maintaining member.

6. The liquid crystal display device according to claim 1, wherein an adhesion strength of said partition wall to said two substrates is lower than an adhesion strength of said adhesive member to said two substrates.

7. The liquid crystal display device according to claim 2, wherein an adhesion strength of said partition wall to said two substrates is lower than an adhesion strength of said adhesive member to said two substrates.

8. The liquid crystal display device according to claim 1, wherein
said partition wall and said adhesive member are connected so that a gap section is formed between said partition wall and said adhesive member,
said gap section is in a state of being filled with a substance having no optical rotatory power or a vacuum state, and
polarization plates in a crossed-nicol state are disposed on outer surfaces of said two substrates including said gap section.

9. The liquid crystal display device according to claim 2, wherein
said partition wall and said adhesive member are connected so that a gap section is formed between said partition wall and said adhesive member,
said gap section is in a state of being filled with a substance having no optical rotatory power or a vacuum state, and
polarization plates in a crossed-nicol state are disposed on outer surfaces of said two substrates including said gap section.

10. The liquid crystal display device according to claim 1, wherein
said partition wall is placed to enclose said display region, except for a part of an outer circumference of said display region.

11. The liquid crystal display device according to claim 2, wherein
said partition wall is placed to enclose said display region, except for a part of an outer circumference of said display region.

12. A liquid crystal display device comprising:
two substrates having electrodes;
one or a plurality of adhesive members for sticking peripheral portions of said substrates together so that a gap for sealing a liquid crystal substance is formed; and one or a plurality of partition walls, adhered to said two substrates in a region between said adhesive member and a display region located inside said adhesive member, for reducing stress applied to said liquid crystal substance in the peripheral portions of said substrates;

wherein a layer of said liquid crystal substance touching an end of said partition wall is located outside said display region, thereby preventing defects from extending into said display region, at least one of said partition walls extends continuously along at least one side of said display region, and a plurality of said partition walls are provided, and said partition walls have different widths.

13. A liquid crystal display device comprising:
two substrates having electrodes;
one or a plurality of adhesive members for sticking peripheral portions of said substrates together so that a gap for sealing a liquid crystal substance composed of a plurality of layers with substantially parallel interfaces is formed; and
one or a plurality of partition walls, adhered to said two substrates in a region between said adhesive member and a display region located inside said adhesive member, for reducing stress applied to said liquid crystal substance, wherein a layer touching an end of said partition wall among said plurality of layers is located outside said display region, thereby preventing defects from extending into said display region, at least one of said partition walls extends continuously along at least one side of said display region, and a plurality of said partition walls are provided, and said partition walls have different widths.

14. A method of manufacturing a liquid crystal display device including a liquid crystal substance sealed in a gap formed by sticking peripheral portions of two substrates having electrodes together with one or a plurality of adhesive members, and one or a plurality of partition walls for reducing stress applied to said liquid crystal substance, said partition wall being disposed between the two substrates at a position outside a display region in which said electrodes are placed, said method comprising the steps of:

placing a partition wall having a single aperture therethrough and continuously extending along each side of said display region, said partition wall having an adhesive property at a position of one of said substrates and being located inside said adhesive member but outside said display region, wherein said partition wall is positioned such that a layer of a liquid crystal substance that will touch an end of said partition wall will be located outside said display region, thereby preventing defects from extending into said display region, and the liquid crystal substance will at least be between the partition wall and the adhesive member; and adhering said partition wall to said two substrates by placing said two substrates to face each other and applying pressure and heat from outside.

15. The method of manufacturing a liquid crystal display device according to claim 14, wherein the liquid crystal display device comprises, between said two substrates in the display region, a gap maintaining member for maintaining an opposition distance between said two substrates, and said gap maintaining member is formed using a material same as said partition wall so that said partition wall and said gap maintaining member are formed together.

16. A liquid crystal display device comprising:
two substrates having electrodes;
one or a plurality of adhesive members for sticking peripheral portions of said substrates together so that a gap for sealing a liquid crystal substance is formed; and
a continuous partition wall having a single aperture therethrough, adhered to said two substrates in a region between said adhesive member and a display region located inside said adhesive member, and placed according to an inclination of a layer of said liquid crystal substance, for reducing stress applied to said liquid crystal substance, thereby preventing defects from extending into said display region, and wherein an area between the adhesive member and the continuous partition wall is configured to received the liquid crystal substance.

17. A liquid crystal display device comprising:
two substrates having electrodes;
one or a plurality of adhesive members for sticking peripheral portions of said substrates together so that a gap for sealing a liquid crystal substance composed of a plurality of layers with substantially parallel interfaces is formed; and
a continuous partition wall having a single aperture therethrough, adhered to said two substrates in a region between said adhesive member and a display region located inside said adhesive member, and placed according to inclinations of the layers of said liquid crystal substance, for reducing stress applied to said liquid crystal substance, thereby preventing defects from extending into said display region, and wherein an area between the adhesive member and the continuous partition wall is configured to receive the liquid crystal substance.

18. A method of manufacturing a liquid crystal display device including a liquid crystal substance sealed in a gap formed by sticking peripheral portions of two substrates having electrodes together with one or a plurality of adhesive members, and one or a plurality of partition walls for reducing stress applied to said liquid crystal substance, said partition wall being disposed between the two substrates at a position outside a display region in which said electrodes are placed, said method comprising the steps of:

placing a partition wall having a single aperture therethrough, said partition wall having an adhesive property at a position of one of said substrates, and being located inside said adhesive member but outside said display region, and placed according to an inclination of a layer of said liquid crystal substance, for reducing stress applied to said liquid crystal substance, thereby preventing defects from extending into said display region, wherein an area between the adhesive member and the continuous partition wall is configured to receive the liquid crystal substance; and adhering said partition wall to said two substrates by placing said two substrates to face each other and applying pressure and heat from outside.

* * * * *